United States Patent
Kondo et al.

(10) Patent No.: US 8,337,022 B2
(45) Date of Patent: *Dec. 25, 2012

(54) REAR SURFACE PROJECTION TYPE SCREEN THAT DIFFRACTS AND DIFFUSES HIGH LUMINANCE PROJECTION LIGHT FROM A PROJECTOR INCLUDING FIRST AND SECOND POLARIZING PLATES

(75) Inventors: Tetsujiro Kondo, Minato-ku (JP);
Tetsushi Kokubo, Minato-ku (JP);
Hitoshi Mukai, Minato-ku (JP);
Hirofumi Hibi, Minato-ku (JP);
Kazumasa Tanaka, Minato-ku (JP);
Kenji Tanaka, Minato-ku (JP);
Hiroyuki Morisaki, Minato-ku (JP)

(73) Assignee: Sony Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 12/879,196

(22) Filed: Sep. 10, 2010

(65) Prior Publication Data

US 2010/0328618 A1 Dec. 30, 2010

Related U.S. Application Data

(62) Division of application No. 12/066,498, filed as application No. PCT/JP2006/320676 on Oct. 17, 2006.

(30) Foreign Application Priority Data

Oct. 24, 2005 (JP) .................. 2005-308765
Oct. 11, 2006 (JP) .................. 2006-278093

(51) Int. Cl.
*G03B 21/14* (2006.01)
*G03B 21/56* (2006.01)
*G03B 21/60* (2006.01)

(52) U.S. Cl. .................. 353/20; 359/449; 359/452

(58) Field of Classification Search .................. 353/20, 353/97, 30–31, 122; 359/443, 450, 452, 359/453, 454–460, 738–740; 250/208.1, 250/225, 216

See application file for complete search history.

(56) References Cited

U.S. PATENT DOCUMENTS

| 1,428,007 | A | * | 9/1922 | Craig | 40/444 |
| 5,004,785 | A | * | 4/1991 | Ida et al. | 525/305 |
| 6,278,546 | B1 | * | 8/2001 | Dubin et al. | 359/452 |
| 6,449,089 | B1 | * | 9/2002 | Moshrefzadeh et al. | 359/454 |
| 6,760,157 | B1 | * | 7/2004 | Allen et al. | 359/487.02 |
| 6,833,951 | B2 | * | 12/2004 | Kolosowsky | 359/460 |
| 6,995,907 | B2 | * | 2/2006 | Osawa et al. | 359/460 |
| 2005/0162381 | A1 | * | 7/2005 | Bell et al. | 345/156 |

FOREIGN PATENT DOCUMENTS

JP 59 176734 10/1984
(Continued)

*Primary Examiner* — Que T Le
*Assistant Examiner* — Jennifer Bennett
(74) *Attorney, Agent, or Firm* — Oblon, Spivak, McClelland, Maier & Neustadt, L.L.P.

(57) ABSTRACT

A rear projection image display apparatus that includes one or more projectors that project an image having a high luminance, a first screen having a fibrous texture and that diffracts light incident from the one or more projectors in accordance with a fiber roughness of the fibrous texture, and a second screen attached to the first screen on a side of the first screen opposite the one or more projectors and that diffuses light incident from the first screen and outputs the diffused light.

14 Claims, 16 Drawing Sheets

FOREIGN PATENT DOCUMENTS

| | | |
|---|---|---|
| JP | 06 273851 | 9/1994 |
| JP | 07 005570 | 1/1995 |
| JP | 08 094974 | 4/1996 |
| JP | 08 262368 | 10/1996 |
| JP | 09 265132 | 10/1997 |
| JP | 11 064973 | 3/1999 |
| JP | 11 344769 | 12/1999 |
| JP | 2001 034 304 | 2/2001 |
| JP | 2001-183605 | 7/2001 |
| JP | 2002 207253 | 7/2002 |
| JP | 2004 215715 | 8/2004 |
| JP | 2004 247868 | 9/2004 |
| JP | 2004 533002 | 10/2004 |
| JP | 2005 024828 | 1/2005 |
| JP | 2005 128352 | 5/2005 |
| JP | 2005 274955 | 10/2005 |

\* cited by examiner

REAR SURFACE PROJECTION TYPE SCREEN THAT DIFFRACTS AND DIFFUSES HIGH LUMINANCE PROJECTION LIGHT FROM A PROJECTOR INCLUDING FIRST AND SECOND POLARIZING PLATES

CROSS-REFERENCE TO RELATED APPLICATIONS

This application is a divisional of and is based upon and claims the benefit of priority under 35 U.S.C. §120 for U.S. Ser. No. 12/066,498, filed Mar. 12, 2008 the entire contents of which is incorporated herein by reference which is the national stage of PCT/JP06/320676 filed Oct. 17, 2006, and claims the benefit of priority under 35 U.S.C. §119 from Japanese Patent Application Nos. 2005-308765, filed Oct. 24, 2005 and 2006-278093, filed Oct. 11, 2006.

TECHNICAL FIELD

The present invention relates to an image display apparatus that performs display output of a large picture, and more particularly to a projection type image display apparatus that performs display output of a large picture by projecting a picture on a screen with the use of a projector.

Further particularly, the present invention relates to a rear projection type image display apparatus that diffuses a high luminance projection light from a projector at a transmission type screen installed at an image formation plane thereof to form an observable image, and more particularly to a rear projection type image display apparatus that has a larger half-power angle and blocks a direct light from a projector for an observer.

BACKGROUND ART

Such as a television receiver, image display apparatuses like a CRT (Cathode Ray Tube) display and a LCD (Liquid Crystal Display) have been widely spread. In recent years, demands on large pictures for home theater purpose monitors, large-screen televisions, and the like, have been increased.

As typical means for forming a large picture, a projection type image display apparatus has been widely known, which performs image formation with an illumination light from a projector on a screen to display an image. Also, a projection type image display apparatus may be roughly classified into two types of front projection type that projects an illumination light from a projector on a front side of a screen facing an observer, and rear projection type that provides projection on a transmission type screen and a formed image is observed from a rear side.

The basic structure of a rear projection type image display apparatus is that a small, high luminance image is enlarged and projected on a rear surface side of a transmission type screen viewed by an observer. An image source may employ a CRT (Cathode Ray Tube) projector, however, in recent years, a configuration using a spatial modulation element such as a liquid crystal projector is being developed. Also, images respectively from monochromatic projectors of three primary colors may be superposed on a rear surface of a transmission type screen to form a color image.

For a rear projection type image display apparatus, one of major design guidelines is that a front gain is increased and projection is provided on a screen in order to increase the luminance at the front side and to attract the observer's eye. Also, in order to prevent a "hot spot" phenomenon in which a light source becomes noticeable in a projection image on a screen, a transmission type screen is typically constituted by a diffusing plate. Distribution of light is performed by diffusing light, which has formed an image, in various directions, so as to form a good image and supply the image to an observer.

For example, a rear projection type screen is suggested, in which a lenticular lens with its horizontal direction being a longitudinal direction is formed at a light incident surface, a light non-transmitting portion in which a black stripe with its horizontal direction being a longitudinal direction is located near a focal point of the lenticular lens, and a lenticular lens with its perpendicular direction being a longitudinal direction is formed at a light outgoing surface, so as to realize a fine lenticular lens pitch not causing a moire disturbance and to reduce reflection of outside light (for example, refer to Patent Citation 1).

Also, a light diffusing sheet and a rear projection type screen are suggested, in which light transmitting layers made of polycarbonate or MS resin having a low hygroscopicity are provided on both sides of a diffusing layer essentially consisting of PMMA, whereby a warp due to moisture absorption hardly occurs and a good diffusion characteristic is exhibited (for example, refer to Patent Citation 2).

Also, a rear projection screen purpose diffusion structure plate is suggested, in which a plurality of reflecting mirrors having a parabolic cylinder shape are formed in parallel between an incident surface and an outgoing surface of a diffusing sheet, to make a contribution to sharpening of an image (for example, refer to Patent Citation 3).

Also, a transmission type screen that can be used for a rear transmission type image display apparatus is suggested, in which a plurality of microlenses that collect an incident light, a black matrix provided on the outgoing side of the microlenses and having an aperture part in an optical path of the transmitted light, a diffusing portion having a recess at a portion corresponding to the aperture part to diffuse the transmitted light of the microlenses, are provided, thereby providing a good viewing angle characteristic, and a good light utilization efficiency (for example, refer to Patent Citation 4).

Also, recently, a multi-projection system (refer to FIG. 16) is known as one of trials for increasing the projection region and resolution, in which projectors are arranged in an array or the like, so that a plurality of images are partially superposed on each other and are projected on a screen to display a large image.

For example, a liquid crystal display multi-projection apparatus is suggested, in which an optical axis of a projection image from each image projection unit is determined so as to be substantially parallel to the projection screen, and an image is reflected by a reflecting mirror near the projection screen to be displayed on the projection screen, thereby providing a thin configuration (for example, refer to Patent Citation 5).

Also, a multi-projection type display apparatus is suggested, in which the brightness of a part of an image signal, corresponding to each image, superposed on an adjacent image is electrically finely adjusted to project an image corresponding to a plurality of image signals, and the brightness of the superposed part superposed on the adjacent image is optically attenuated with a predetermined smooth distribution to smoothen the brightness at the superposed part, thereby making the superposed part of the image less noticeable though being adjacent (for example, refer to Patent Citation 6).

Also, a large screen display apparatus is suggested, in which an upper projector for projecting an image signal on an upper surface region of a screen at an acute angle is installed at an upper front portion of the screen, and a lower projector for projecting an image signal angle on a lower surface region of the screen at an acute is installed at a lower front portion of the screen, so that a person is prevented from being obstruct because the person getting into between the screen and the projector when the person views the image on the screen (for example, refer to Patent Citation 7).

In the front projection type, if a picture is enlarged, there is a problem that the shadow of an observer may be easily reflected on the screen. In light of this, if the region is enlarged, such as when projectors are arranged in an array to realize multi-projection, the inventors of the present invention consider that it is desirable to employ the rear projection type.

Meanwhile, a projection light from a projector, such as a LCD (Liquid Crystal Display) or a CRT, is basically divergent from a central portion to a peripheral portion, and partially extremely, high-directional light is incident on the transmission type screen. As described above, through the appropriate distribution of light using the diffusing plate, an observable image can be at least obtained on the screen. However, since the projection light is divergently incident and the peripheral portion has the outward directional property, when being observed from the front side of the screen, there is a problem that the peripheral luminance becomes darker than the central luminance. For example, when being observed obliquely, unevenness of brightness of the picture is generated such that a near edge portion becomes bright whereas a far edge portion becomes dark.

Even though a diffusing plate is provided in the path of the projection light, or the projection screen itself is constituted by a diffusing plate for diffusing the light beam, which has formed an image, in various directions to equalize the luminance, it is difficult to have a maximum gain at the front side of the projector and to avoid generating a phenomenon that a gain becomes small as an angle increases with respect to a light beam direction with the maximum gain obtained. As a typical index for the change in screen gain, an angle at which the maximum gain becomes half, that is, a "half-power angle" is used. As the half-power angle increases, a good large picture with a wide viewing angle can be obtained.

In the case of the front projection type image display apparatus, the half-power angle is 80 degrees, thereby obtaining diffusion in a wide range. In contrast, in the case of the rear projection type image display apparatus, because of the design guideline that the luminance at the front side is increased (described above), the half-power angle is merely about 45 degrees at maximum even when a highly diffusive screen is used. In other words, through the rear projection, even though a diffusing plate for simple diffusion is used, it is difficult to perform perfect diffusion, causing a high front gain.

Having a small half-power angle means that the amount of attenuation in luminance becomes radical when an image is viewed from a position other than the front side (that is, when an angle defined by an axis perpendicular to the screen and a line of sight is large), the color may be changed, the unevenness of color may be generated, or the unevenness of luminance may be seriously increased, depending on the location of the image displayed on the screen. Thus, when the multi-projection system in which the projectors are arranged in an array is constructed, if the rear projection type projector causing a half-power angle to be small is used, the front gain of each outgoing light on the screen becomes higher than the peripheral gain, thereby possibly becoming a factor of degrading the image quality.

Using a Fresnel lens as means for solving the problem of the half-power angle in the rear projection type image display apparatus, is known in the art.

For example, a projection screen is suggested, in which a Fresnel lens sheet, a first lenticular sheet having a convex cylindrical lens arranged in a first direction, and a second lenticular sheet having a convex cylindrical lens arranged in a second direction orthogonal to the first direction, are arranged in that order (for example, refer to Patent Citation 8), thereby extending the sight in two directions of left-right (horizontal) direction, as well as up-down (perpendicular) direction, and strictly controlling the outgoing range and contrast of display image light.

However, when the projection is provided on the screen through the Fresnel lens, although the brightness at a "blending region" (refer to FIG. 16), where projection planes of the projectors are superposed, can be equalized, since the Fresnel lens has a limit for a corresponding incident angle gentleman, the directional property of the outgoing light cannot be eliminated. Also, because of the limit for the corresponding incident angle, the installation position of the projector with respect to the Fresnel lens is restricted strictly. Further, if the Fresnel lens is used, it is difficult to form a large screen, and hence, there is a problem that the manufacturing cost may become high.

Also, as another problem of the rear projection type image display apparatus, since the illumination light from the projector is directed to an observer through the transmission type screen, there is a problem that a direct light is transmitted and observed.

Patent Citation 1: Japanese Unexamined Patent Application Publication No. 11-344769
Patent Citation 2: Japanese Unexamined Patent Application Publication No. 2002-207253
Patent Citation 3: Japanese Unexamined Patent Application Publication No. 2005-24828
Patent Citation 4: Japanese Unexamined Patent Application Publication No. 2005-128352
Patent Citation 5: Japanese Unexamined Patent Application Publication No. 9-265132 Patent Citation 6: Japanese Unexamined Patent Application Publication No. 2001-34304
Patent Citation 7: Japanese Unexamined Patent Application Publication No. 2004-247868
Patent Citation 8: Japanese Unexamined Patent Application Publication No. 2004-215715

DISCLOSURE OF THE INVENTION

Technical Problem

An object of the present invention is to provide an excellent rear projection type image display apparatus capable of properly forming an observable image with a luminance spot reduced by diffusing a high luminance projection light from a projector at a transmission type screen installed at an image formation plane of the projector.

Another object of the present invention is to provide an excellent rear projection type image display apparatus that has a large half-power angle of a gain through rear transmission, and can obtain diffusion in a wider range, so as to prevent a luminance spot corresponding to a location of an image displayed on a transmission type screen and to prevent attenuation in luminance when the image is viewed from a position other than the front side.

Another object of the present invention is to provide an excellent rear projection type image display apparatus having a larger half-power angle and being capable of properly blocking a direct light from a projector for an observer.

Another object of the present invention is to provide an excellent rear projection type image display apparatus capable of reducing change in color and unevenness of luminance depending on a viewing angle when a projection region is enlarged through multi-projection, and capable of providing an image equalized over the entire screen.

Another object of the present invention is to provide an excellent rear projection type image display apparatus capable of reducing the change in color and the unevenness of luminance depending on a viewing angle when the projection region is enlarged through the multi-projection, and capable of providing an image equalized over the entire screen, while meeting with a design guideline of rear projection such that the luminance at the front side is increased.

Technical Solution

The present invention is made in light of the above-described problems, and a first aspect thereof is a rear projection type image display apparatus characterized by comprising a projector for projecting an image having a relatively high luminance, a transmission type screen installed at an image formation plane of a projection light from the projector and made of a texture, and direct light blocking means for blocking a direct light from the projector, the direct light not being diffused at the transmission type screen, but being transmitted therethrough.

As typical means for forming a large picture, a projection type image display apparatus is widely known, which performs image formation with an illumination light from a projector on a screen to display an image. This type of image display apparatus may be roughly classified into front projection type and rear projection type. With the latter, the projection region can be enlarged, as well as the resolution of a projection image can be increased, for example, by arranging projectors in an array.

Unfortunately, the rear projection type image display apparatus has a small half-power angle for diffusion as compared with the front projection type, and hence, there is a problem of a luminance spot depending on a location of an image displayed on a screen, or a problem of attenuation in luminance when viewed from a position other than the front side.

Therefore, in the rear projection type image display apparatus according to the present invention, the transmission type screen for diffusing light installed at the image formation plane of the projection light of the projector employs a texture such as cotton, silk, or artificial fiber (Tetron=Tetron pongee), so as to promote an increase in the half-power angle for the diffusion. By rear-projecting the image from the projector on the texture as the screen, a fine image can be projected.

Also, when the projection light from the projector is rear-projected, there is a problem that a direct light is not sufficiently diffused at the screen and hence the direct light directly reaching the observer is observed. In particular, if a screen made of the texture is used, the direct light is accompanied by diffraction, and the direct is spread in the stitch direction of the texture, resulting in a serious problem.

Hence, in the rear projection type image display apparatus according to the present invention, direct light blocking means is disposed to block the direct light from the projector passing through the transmission type screen, so that the direct light is not observed by the observer.

In particular, the direct light blocking means is constituted by a first polarizing plate disposed in front of an exit pupil of the projector, and a second polarizing plate disposed near the rear surface (that is, the surface on the observer side) of the transmission type screen. The direct light blocking means is configured such that a first polarizing axis of the first polarizing plate is substantially orthogonal to the second present optical axis of the second polarizing plate. Since the polarizing axes of the pair of polarizing plates are orthogonal to each other as described above, only the scattering light diffused at the transmission type screen passes through the second polarizing plate, and can be observed at the rear surface side of the screen, that is, by the observer, and the direct light from the projector is eliminated by the second polarizing plate.

Also, by arranging the first polarizing plate near the front of the exit pupil of the projector, the size of the first polarizing plate can be decreased. However, in this case, it is necessary to use a heat-resistant polarizing plate because the polarizing plate is affected by heat from a light source. A polarizing plate having a high heat resistance may be, for example, a glass polarizing filter in which a thin plate with iodine absorbed is expanded in a direction to align molecules substantially in parallel, and then is interposed between glass plates; a filter using quartz, or the like.

The projector for generating a high luminance image may be a 3LCD projector, a reflection type liquid crystal (LCOS) projector, a DLP projector, a CRT projector GLV projector, or the like.

Among these, the 3LCD projector has a structure that an illumination light from a single, high luminance light source is first separated into components of three primary colors of RGB by using a mirror, such as a dichroic mirror, that only transmits a predetermined wavelength, the lights respectively controlled by LCDs respectively corresponding to the colors are combined by a prism, and then the light is projected. Also, in a LCOS (Liquid Crystal on Silicon), a rotating prism mechanism that separates light into RGB and projects the light is driven in a sequential optical manner. Since a reflected light is a polarized light, in these methods, a transmitted light is polarized every time at the separation into the color components with the mirror, and hence, a predetermined polarized condition is provided such that, for example, polarizing axes of R and B are aligned whereas a polarizing axis of G is orthogonal thereto. In this case, if the polarizing axis of one of the light components is arranged so as to be substantially parallel to the first or second polarizing axis, that light component is no longer transmitted through the second polarizing plate. Hence, it is necessary to configure the first and second polarizing axes so as not to be parallel to the polarizing axis of any of the components of the projection light.

To be more specific, when a projector is used, in which a polarizing axis of LCDs for R and B and a polarizing axis of a LCD for G define 90 degrees, the polarizing axis of the second polarizing plate is arranged so as to define about 45 degrees with respect to the polarizing axes of both the LCDs. Accordingly, the components of R, B, and G can be equally attenuated.

Also, a second aspect of the present invention is a rear projection type image display apparatus characterized by comprising one or more projectors for projecting an image having a relatively high luminance, and a rear projection purpose screen for diffusing an incident light to each of the projectors so that a gain characteristic, in which a gain of an outgoing light for each outgoing angle is normalized by a front gain, does not depend on an incident angle.

The rear projection type mentioned here may be constituted such that two kinds of screens made of different materials, i.e., a matt screen arranged on the viewer side and a screen arranged on the projector side and made of a fibrous texture, are arranged in parallel. The matt screen mentioned here is, for example, that diffusing particles are kneaded into vinyl chloride resin and processed by molding, and the fibrous texture may use Tetron pongee or the like.

Such a rear projection purpose screen has no restrictive condition relating to the corresponding incident angle, the incident lights from the projectors arranged at any locations are output as the outgoing lights uniformly having a high front gain. Accordingly, if the multi-projection system is applied, it is expected that any incident light has a high front gain after being transmitted through the screen without the arrangement of the individual projectors being particularly restricted. The installation location of each projector is not restricted to the fixed one position, and may be arranged at any location. Thus, the outgoing lights are superposed on the screen surface on the viewer side, and the change in luminance gain becomes small, that is, the half-power angle becomes large for the entire screen, thereby realizing widening of the viewing angle.

When the illumination light from the projector is projected on the rear projection purpose screen of the above-described double-layer structure, even if the optical center axis of the incident light from the projector does not correspond to the axis perpendicular to the screen surface and the plurality of projectors are installed to have various incident angles, the change in the color and luminance depending on the viewing position can be reduced.

If the multi-projection system is constituted by using such a rear projection type screen of the double-layer structure, even when the different colors are superposed using the plurality of projectors, the illumination lights from the projectors are equally received regardless of the observation position, and hence, the equivalent color can be viewed at any observation position. In contrast, in the conventional screen of simple diffusion type or the like, the intensity of light from each projector may vary at a blending region depending on the view angle, and the change in intensity is observed as change in color or luminance.

Advantageous Effects

With the present invention, the excellent rear projection type image display apparatus can be provided, which has the large half-power angle of the gain through the rear transmission, and can obtain diffusion in the wider range, so as to prevent the unevenness of luminance depending on the location of an image on the transmission type screen and to prevent the attenuation in luminance when the image is viewed from a position other than the front side.

Also, with the present invention, the excellent rear projection type image display apparatus can be provided, which has the larger half-power angle and can properly block a direct light from the projector for the observer.

Also, with the present invention, since the rear projection type screen employs the screen having the larger half-power angle, high diffusion, and wide viewing characteristic, the excellent rear projection type image display apparatus can be provided, which can enlarge the projection region while preventing the change in color or the unevenness of the luminance when the multi-projection is applied.

With the rear projection type image display apparatus according to the present invention, by performing the diffusion at the screen so that the incident lights from the projectors have a gain pattern with a high front gain without depending on the installation positions of the projectors, the large picture can be realized, and a uniform image regardless of the viewing position can be provided.

With the conventional rear projection type image display apparatus, an optical axis of an incident light from a projector is properly arranged so as to be perpendicular to a projection screen. In contrast, with the rear projection type image display apparatus according to the present invention, since the change in color or the unevenness of luminance in the projection image can be prevented from being generated by diffusing the incident light at any incident angle at the screen so as to have a high front gain, thereby reducing the restricted condition relating to the arrangement of the projector. For example, an arrangement is available such that an incident angle of an incident light from a projector is approximately parallel to a screen surface.

Other objects, features, and advantages of the present invention will be apparent with below-described embodiments and detailed descriptions based on the attached drawings of the present invention.

Figure 1:
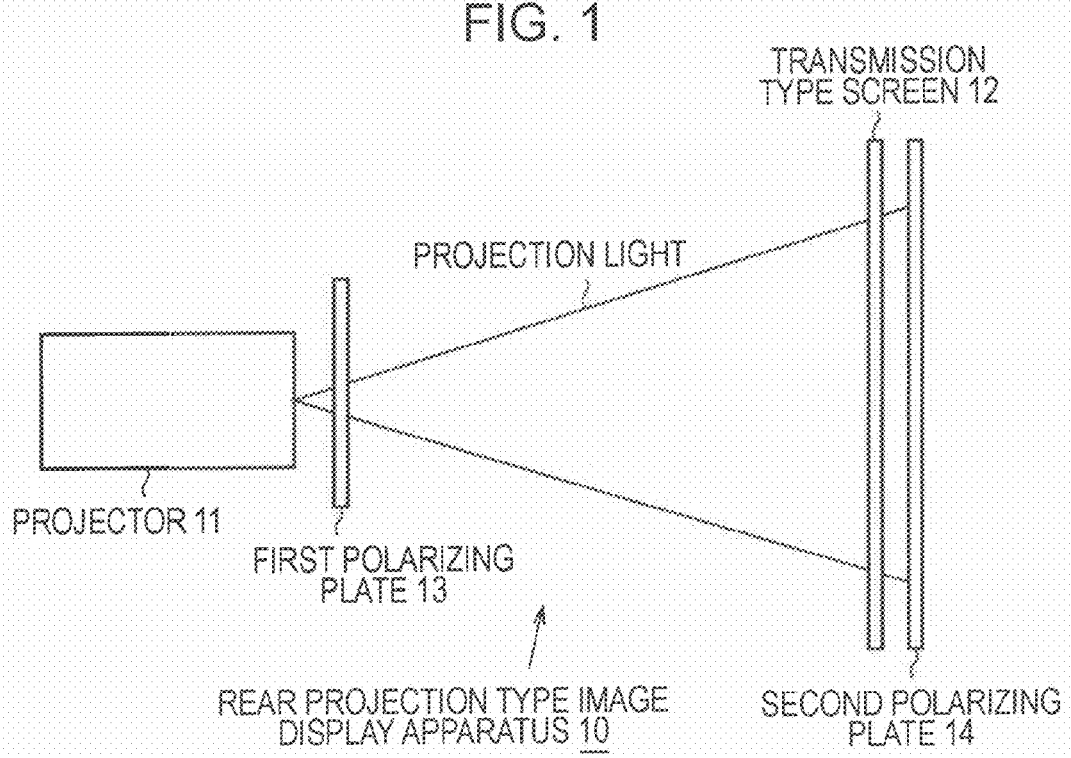
FIG. 1 is an illustration schematically showing a configuration of an image display apparatus according to a first embodiment of the present invention.

EXPLANATION OF REFERENCE NUMERALS 10 rear projection type image display apparatus
11 projector
12 transmission type screen
13 first polarizing plate
14 second polarizing plate
20 image display apparatus
21 projection purpose screen
22 rear projection purpose screen
22A screen made of fibrous texture
22B matt screen

BEST MODES FOR CARRYING OUT THE INVENTION

Hereinafter, embodiments of the present invention are described in detail with reference to the drawings.

FIG. 1 schematically shows a configuration of an image display apparatus according to a first embodiment of the present invention. The illustrated image display apparatus is a rear projection type image display apparatus that performs image formation with an illumination light from a projector on a screen to display an image, and more specifically, is a rear projection type image display apparatus that enlarges and projects a small, high luminance image emitted from a projector on a rear surface of a transmission type screen viewed by an observer. The region may be enlarged, for example, by arranging projectors in an array.

This rear projection type image display apparatus 10 includes a projector 11 that projects an image having a relatively high luminance, a transmission type screen 12 installed at an image formation plane of a projection light from the projector 11, and a direct light blocking portion provided for blocking a direct light from the projector and composed of a first polarizing plate 13 and a second polarizing plate 14.

The transmission type screen 12 is usually constituted by a diffusing plate that properly distributes light so that a good image without a luminance spot can be obtained using a projection light from the projector 11. In the present embodiment, a texture, such as cotton, silk, or artificial fiber (Tetron=Tetron pongee), is used as the transmission type screen 12. Accordingly, a half-power angle of diffusion can be increased.

Figure 2:
FIG. 2 is an illustration showing a state that an image (in which a dog is recorded) is rear-projected from a projector 11 with a texture used as a transmission type screen 12.

The Tetron pongee is a material of artificial fiber used for, for example, a shop pennant and the like. The Tetron pongee is a texture available at an extremely low price. FIG. 2 shows a state that an image (in which a dog is recorded) is rear-projected from the projector 11 using this texture used as the transmission type screen 12. In this case, although a fine image can be projected, a direct light (which is not diffused and directly reaches an observer) is observed at a portion below the dog's nose. The direct light is accompanied by diffraction, and hence, it can be recognized that the direct light is spread in a stitch direction of the texture.

Figure 3:
FIG. 3 is an illustration showing a state that the transmission type screen 12 is photographed at an angle other than a front side.
Figure 4:
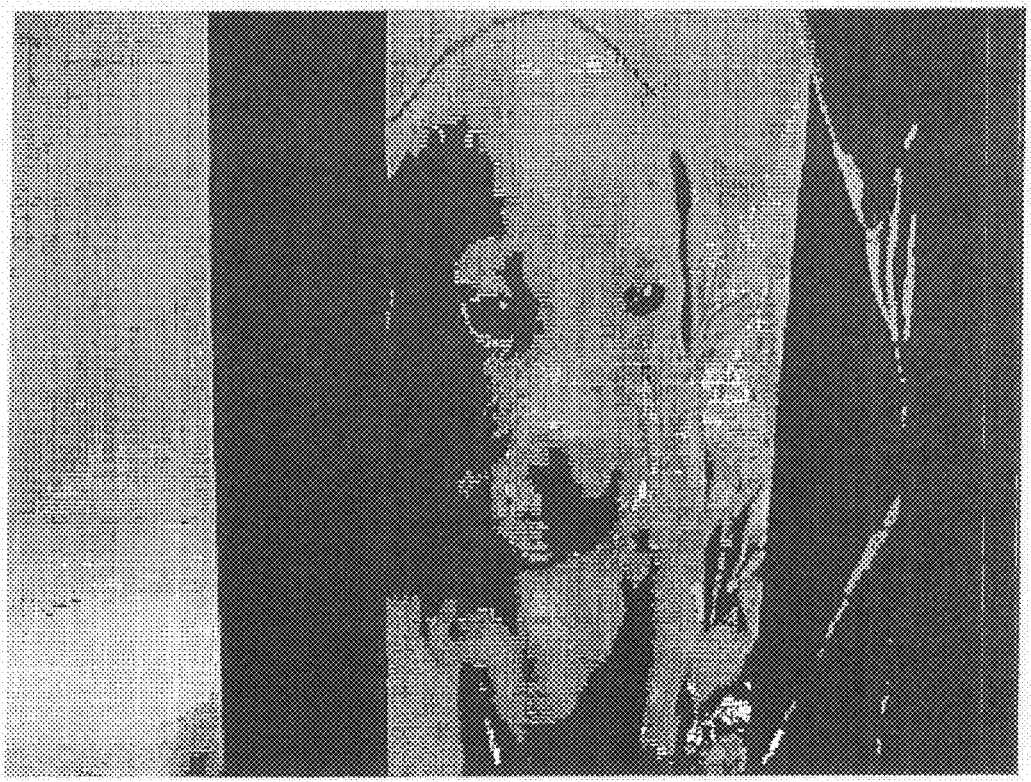
FIG. 4 is an illustration showing a state that the transmission type screen 12 is photographed at an angle other than the front side.

Also, FIGS. 3 and 4 show states that the transmission type screen 12 is photographed at angles other than the front side. The angle is about 30 degrees in FIG. 3, whereas the angle is about 60 degrees in FIG. 4. Even when the angle is 60 degrees or larger with respect to an image formation plane, that is, the transmission type screen 12, the gain is prevented from decreasing. Also, it can be recognized that a luminance spot in the entire image is relatively small. If the angle to the front side exceeds a given value, a direct light does not geometrically reach an observer. As described above, it can be said that the transmission type screen 12 such as cloth, silk, Tetron pongee, or the like, is a diffusing material having a relatively large half-power angle, except for the direct light.

Next, blocking of a direct light is described. In the case of the rear projection type image display apparatus, since the illumination light from the projector is directed to the observer through the transmission type screen, there may be a problem that the direct light is transmitted and observed. In particular, if a screen made of the texture is used, the direct light is accompanied by the diffraction, and the direct is spread in the stitch direction of the texture (described above), resulting in a serious problem.

In the rear projection type image display apparatus 10 according to the present embodiment, the direct light blocking portion composed of the first polarizing plate 13 and the second polarizing plate 14 is configured to block the direct light from the projector. The first polarizing plate 13 is disposed in front of an exit pupil of the projector. The second polarizing plate 14 is disposed near a rear surface (that is, a surface on the viewer side) of the transmission type screen. Then, by arranging such that a first polarizing axis of the first polarizing plate and a second present optical axis of the second polarizing plate are substantially orthogonal to each other, only a scattered light diffused at the transmission type screen passes through the second polarizing plate 14, and may be observed at the rear surface side, that is, by the observer, of the transmission type screen 12. The direct light from the projector is eliminated by the second polarizing plate 14.

Also, by arranging the first polarizing plate 13 near the front of the exit pupil of the projector 11, the size of the first polarizing plate 13 can be further decreased. However, in this case, it is necessary to use a heat-resistant polarizing plate because the polarizing plate is affected by heat from a light source.

A typical polarizing film is configured such that a thin plate with iodine absorbed is expanded in a direction to align molecules in parallel, and is interposed between layers of acetyl butyl cellulose. The service temperature thereof ranges from −50° C. to 80° C. A polarizing plate having a further high heat resistance, for example, a glass polarizing filter in which a thin plate with iodine absorbed is expanded in a direction to align molecules in parallel, and then is interposed between glass plates; a filter using quartz, or the like, can be used.

As the projector 11 for generating a high luminance image, for example, a 3LCD projector, a reflection type liquid crystal (LCOS) projector, a DLP projector, a CRT projector GLV projector, or the like, can be given.

Among these, the 3LCD projector has a structure that an illumination light from a single, high luminance light source is first separated into components of the three primary colors of RGB by using a mirror, such as a dichroic mirror, that only transmits a predetermined wavelength, the lights respectively controlled by LCDs respectively corresponding to the colors are combined by a prism, and then the light is projected. Also, in a LCOS (Liquid Crystal on Silicon), a rotating prism mechanism that separates light into RGB and projects the light is driven in a sequential optical manner.

Since a reflected light is a polarized light, in these methods, a transmitted light is polarized every time at the separation into the color components with the mirror, and hence, a predetermined polarized condition is provided, in which, for example, polarizing axes of R and B are aligned whereas a polarizing axis of G is orthogonal thereto. In this case, if the polarizing axis of one of the light components is arranged so as to be substantially parallel to the polarizing axis of one of the first polarizing plate 13 and the second polarizing plate 14, that light component is no longer transmitted. Hence, it is necessary to configure the first and second polarizing axes so as not to be parallel to the polarizing axis of any of the components of the projection light.

Figure 5:
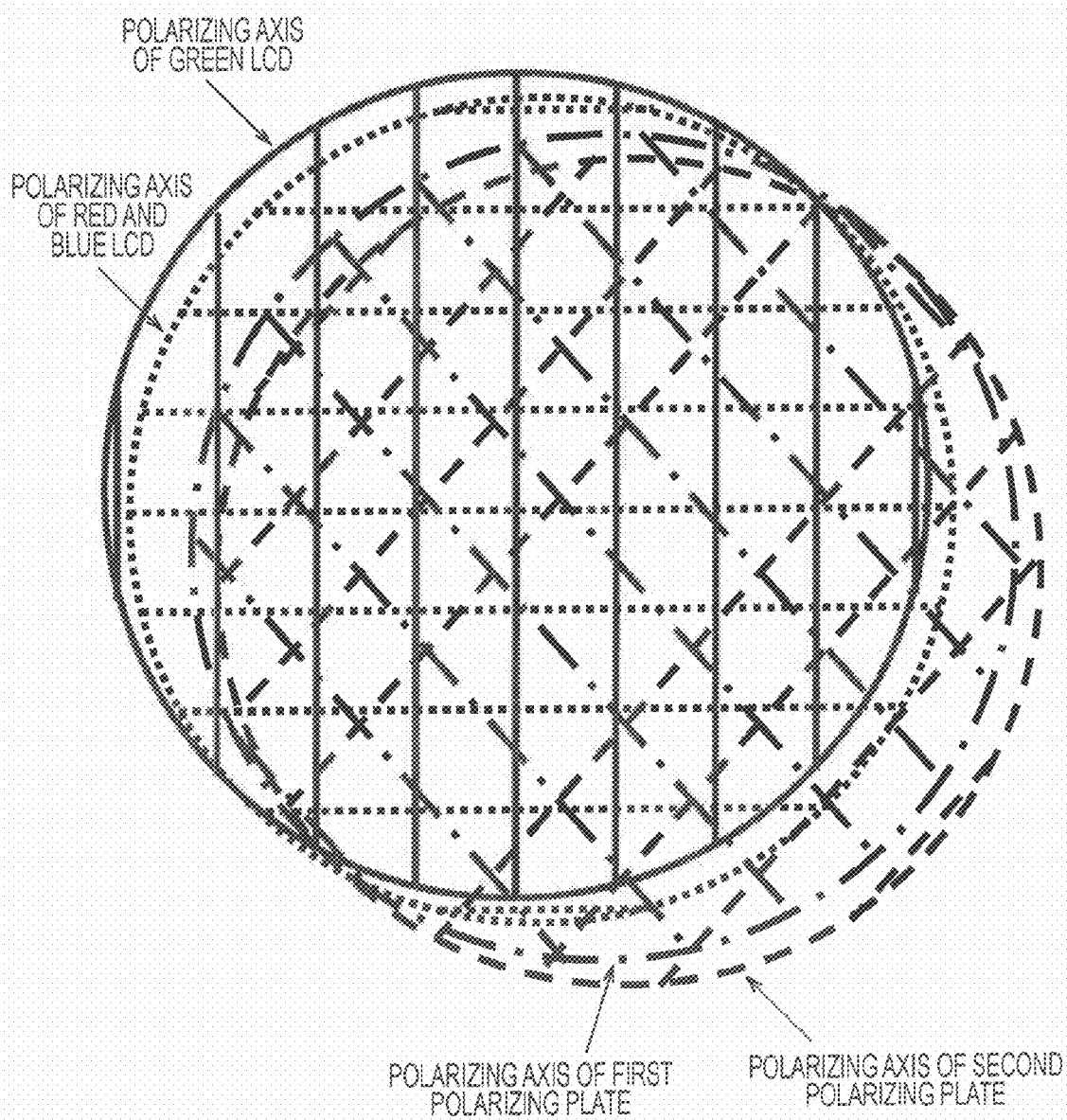
FIG. 5 is an illustration showing a state that, when a projector is used, in which a polarizing axis of LCDs for R and B and a polarizing axis of a LCD for G define 90 degrees, a polarizing axis of a second polarizing plate 14 is arranged so as to define about 45 degrees with respect to both the polarizing axes of the LCDs.

To be more specific, when a projector is used, in which a polarizing axis of LCDs for R and B and a polarizing axis of a LCD for G define 90 degrees, as shown in FIG. 5, the polarizing axis of the second polarizing plate 14 is arranged so as to define about 45 degrees with respect to both the polarizing axes of the LCDs. Accordingly, the components of R, B, and G can be equally attenuated. As a result, a gain of each wavelength of the outgoing light from the projector 11 no longer depends on a direction of a vibrating plane of an electric field vector of a light beam.

Figure 6:
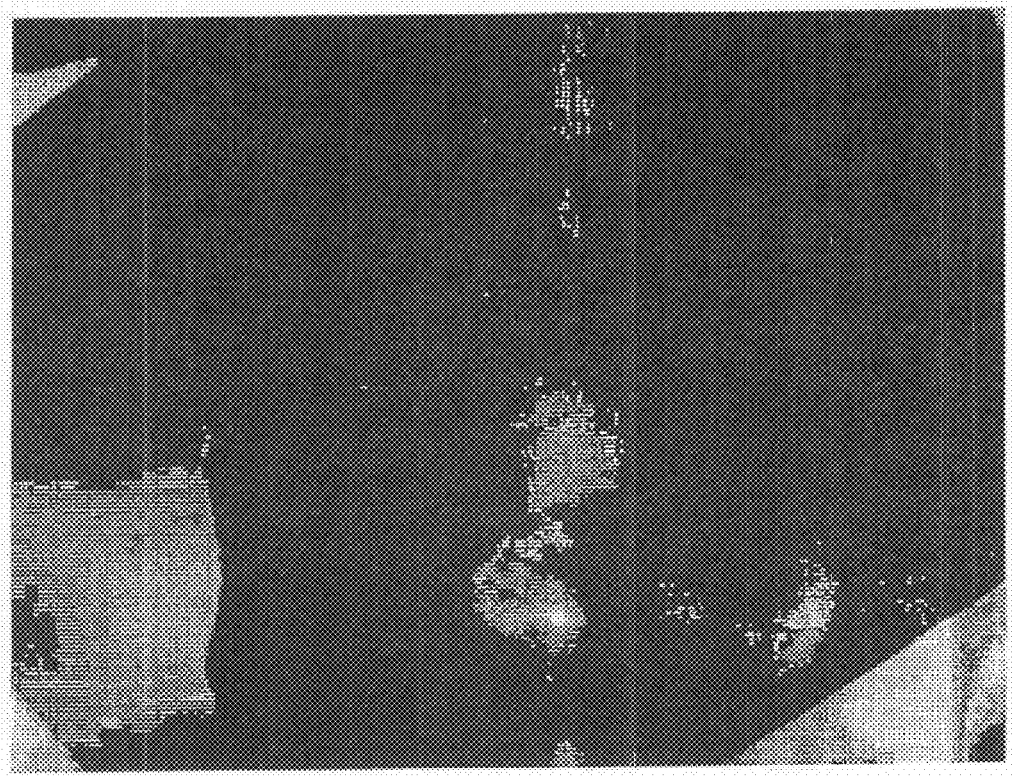
FIG. 6 is an illustration showing an effect of a direct light, and an angle defined by a polarizing axis of a first polarizing plate 13 and the polarizing axis of the second polarizing plate 14.
Figure 7:
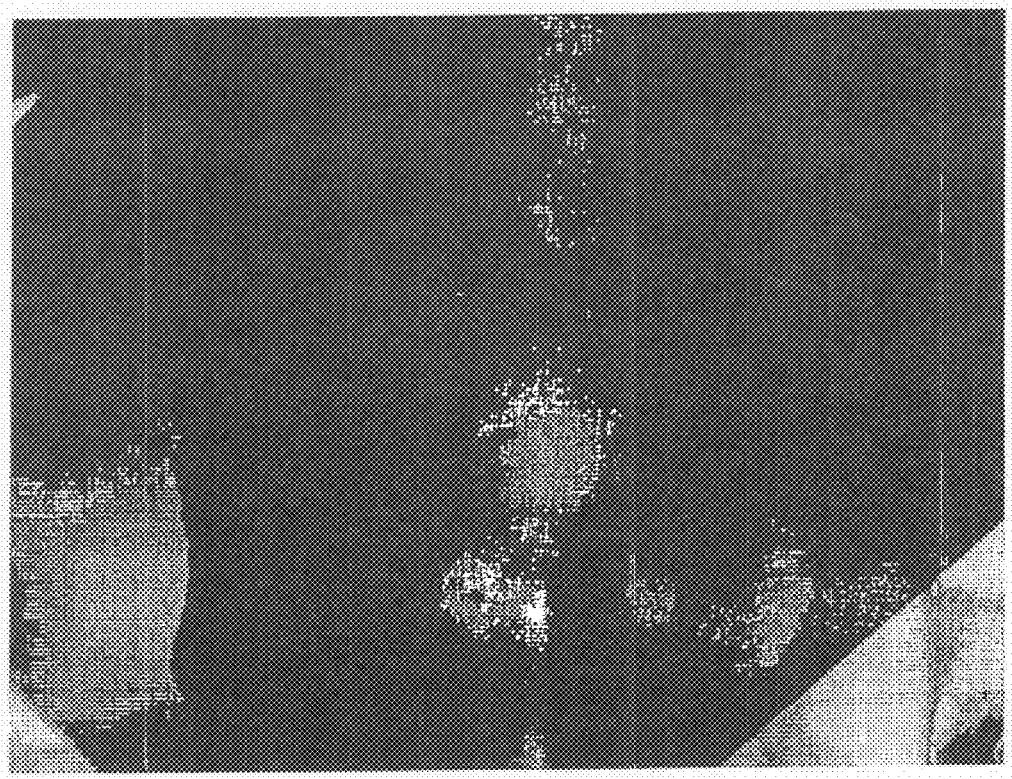
FIG. 7 is an illustration showing an effect of a direct light, and an angle defined by the polarizing axis of the first polarizing plate 13 and the polarizing axis of the second polarizing plate 14.

FIGS. 6 and 7 show an effect of the direct light, and an angle defined by the polarizing axis of the first polarizing plate 13 and the polarizing axis of the second polarizing plate 14. Herein, it is assumed that the second polarizing plate 14 is rotated relative to the first polarizing plate 13.

FIG. 6 shows a state that the polarizing axes of both the polarizing plates 13 and 14 are approximately parallel to each other, and a component of the direct light having a vibrating direction orthogonal to these polarizing axes passes through the second polarizing plate 14. Thus, the effect of the direct light is noticeable when viewed from the front side.

Then, when the second polarizing plate 14 is rotated relative to the first polarizing plate 13, and the polarizing axes of both the polarizing plates 13 and 14 are substantially orthogonal to each other, only a scattered light diffused at the transmission type screen 12 passes through the second polarizing plate 14, resulting in that the direct light is blocked by a certain amount.

FIG. 7 shows a state that the rear surface of the transmission type screen 12 is observed in a direction other than the front side with the direct light blocked. It can be recognized that the gain of the entire projection image is decreased because the polarizing plates 13 and 14 are used, however, the direct light, which may be an obstruction when observed from the front side, is reduced, and the luminance is prevented from being decreased as well as a luminance spot is prevented from appearing in the enter picture when observed at an angle other than the front side.

Figure 8:
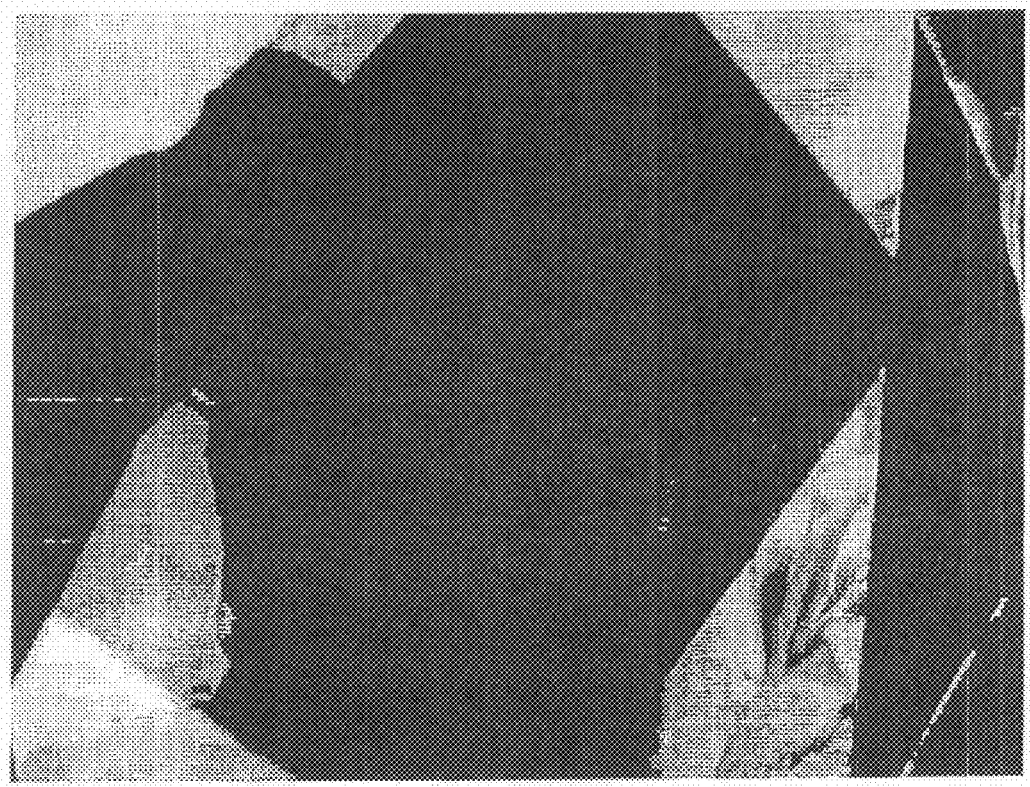
FIG. 8 is an illustration showing a state that a direct light is blocked with a polarizing plate, and a rear surface of the transmission type screen 12 is observed at an angle other than the front side.
Figure 9:
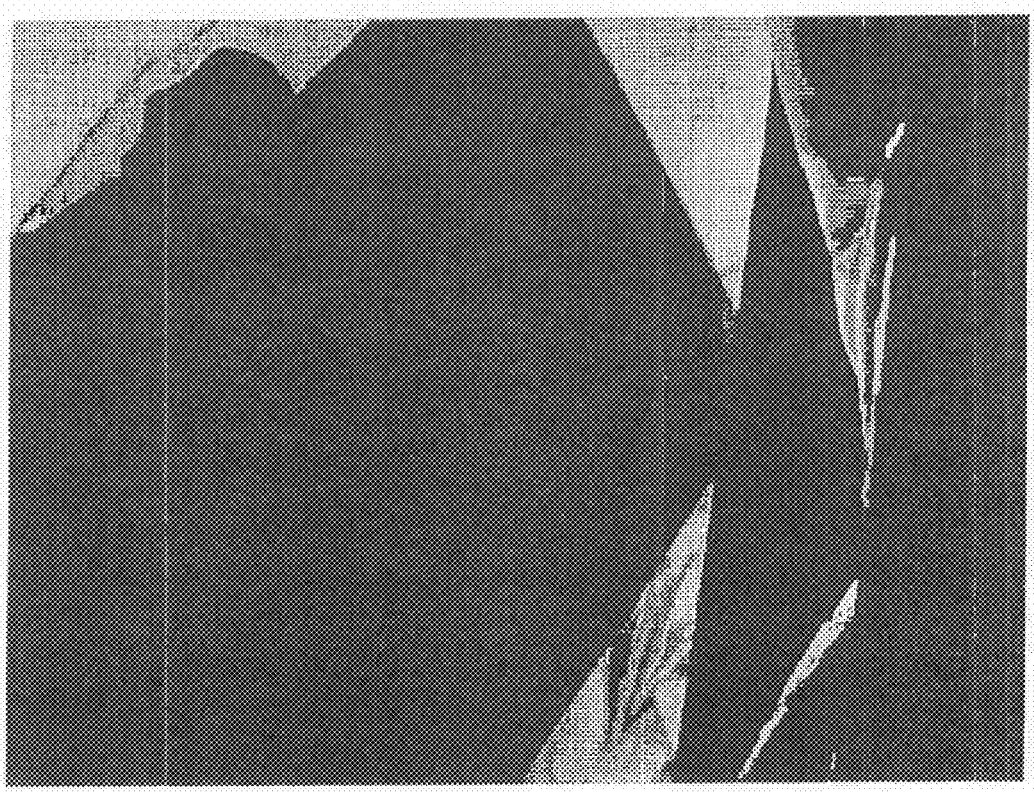
FIG. 9 is an illustration showing a state that a direct light is blocked with the polarizing plate, and the rear surface of the transmission type screen 12 is observed at an angle other than the front side.

Also, FIGS. 8 and 9 show states that the direct light is blocked, and the rear surface of the transmission type screen 12 is observed at angles other than the front side. The angle is about 30 degrees in FIG. 8, whereas the angle is about 60 degrees in FIG. 9.

Next, a second embodiment of the present invention is described. The second embodiment relates to a rear projection type image display apparatus to which multi-projection is applied.

A projection type image display apparatus can form a large picture by performing image formation with an illumination light from a projector on a screen to display an image on the screen. With a multi-projection system, images respectively displayed by a plurality of projectors are partially superposed on each other, projected on a screen, and accordingly, a projection region can be further enlarged, as well as resolution can be increased.

The inventors of the present invention consider that a rear projection type image display apparatus is appropriate for increasing the size of the picture in view of that the shadow of an observer is not reflected on the screen (described above). However, using a projector having a small half-power angle is disadvantageous to construct the multi-projection system.

Figure 17A:
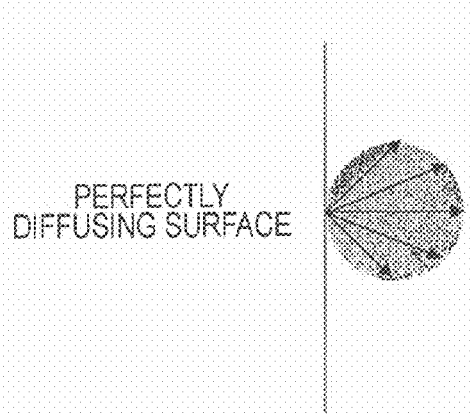
FIG. 17A is an illustration showing a state that outgoing lights passing through a screen, which also serves as a diffusing plate, are perfectly diffused.

A screen gain does not depend on an angle defined by the incident light and the outgoing light as long as the outgoing light passing though the screen, which also serves as a diffusing plate, is perfectly diffused (refer to FIG. 17A). In this case, even though the multi-projection system is applied, it is considered that the change in color or the unevenness of luminance be hardly generated at the projection image.

Figure 17B:
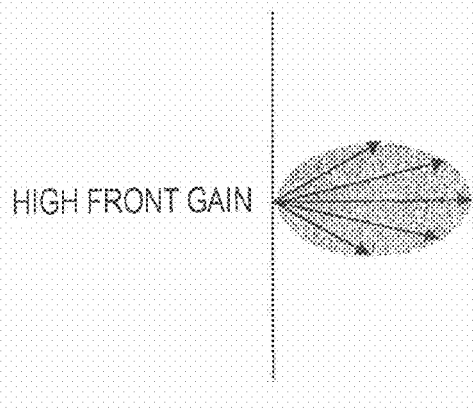
FIG. 17B is an illustration showing a state that outgoing lights passing through a screen, which also serves as a diffusing plate, are diffused to have a high front gain.
Figure 18:
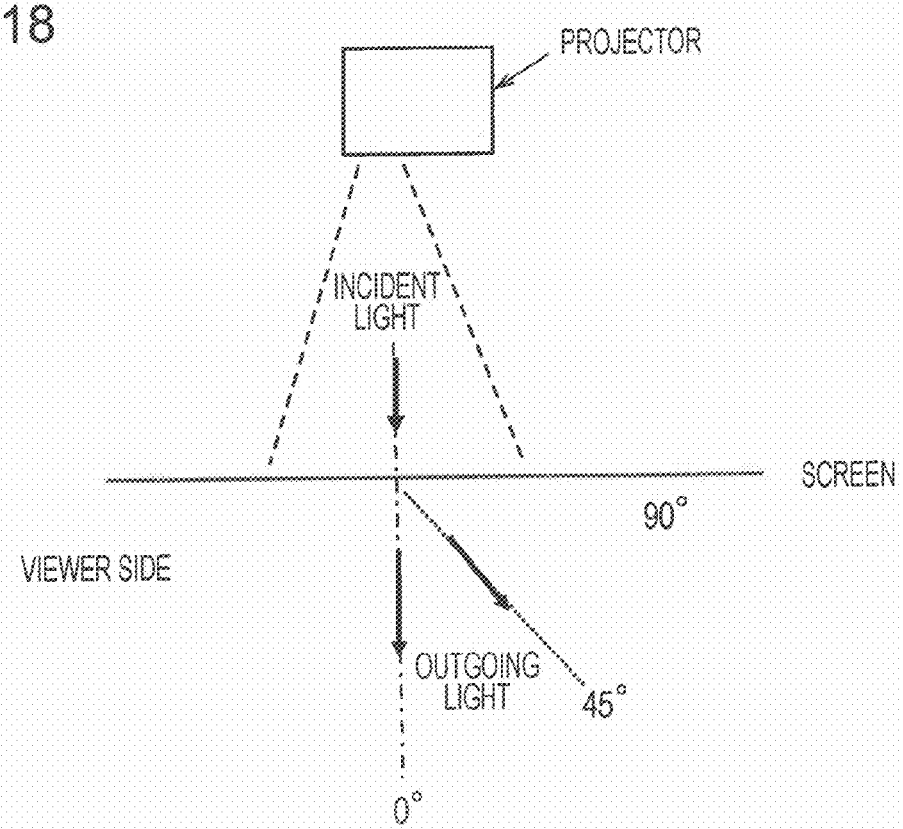
FIG. 18 is an illustration showing a state that an illumination light from a projector is rear-projected.

However, there is the major design guideline that the luminance at the front side is increased through the rear projection (described above), and hence, the outgoing light transmitted through the diffusing screen has a high gain in the front side direction (refer to FIG. 17B). In other words, through the rear projection, even though a diffusing plate for simple diffusion is used, it is difficult to perform the perfect diffusion as shown in FIG. 17A, causing a high front gain. FIG. 18 shows a state that an illumination light from a projector is rear-projected. The outgoing light has a maximum gain at a location positioned like the same line as the incident light on the center axis coming from the projector (at a location at 0° in FIG. 18). The gain is decreased as the angle defined by the incident light and the outgoing light is increased.

Figure 19:
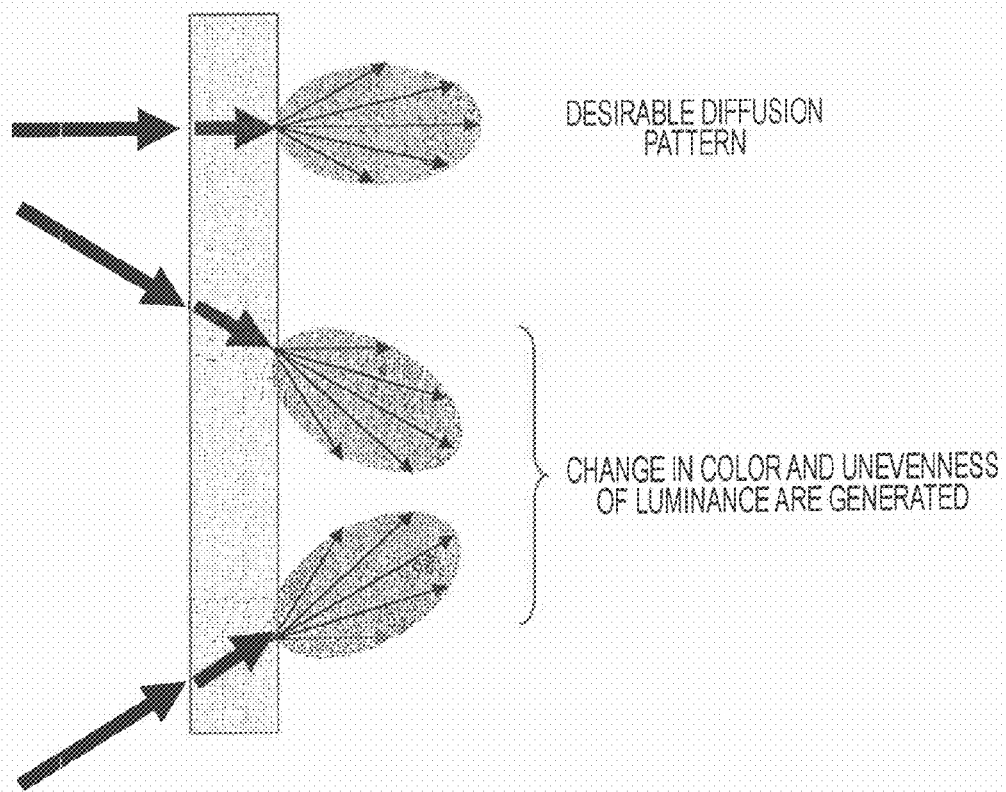
FIG. 19 is an illustration showing a state that a plurality of incident lights having a maximum gain in a forward direction of light each are simply diffused at a diffusing screen.

Herein, when a plurality of incident lights having a maximum gain in a forward direction of light are simply diffused at the diffusing screen, uneven brightness is observed in a picture because each incident light has a luminance of a high gain in a direction corresponding to the outgoing angle as shown in FIG. 19 (that is, the outgoing lights are not aligned with the diffusion pattern having a high front gain). As described above, the diffused condition is varied in accordance with the incident angle to the screen, whereby the change in color or the unevenness of luminance may be generated depending on an observation location. Thus, the inventors of the present invention consider that it is necessary to solve such problems, so as to constitute the multi-projection system using the rear projection.

Figure 20:
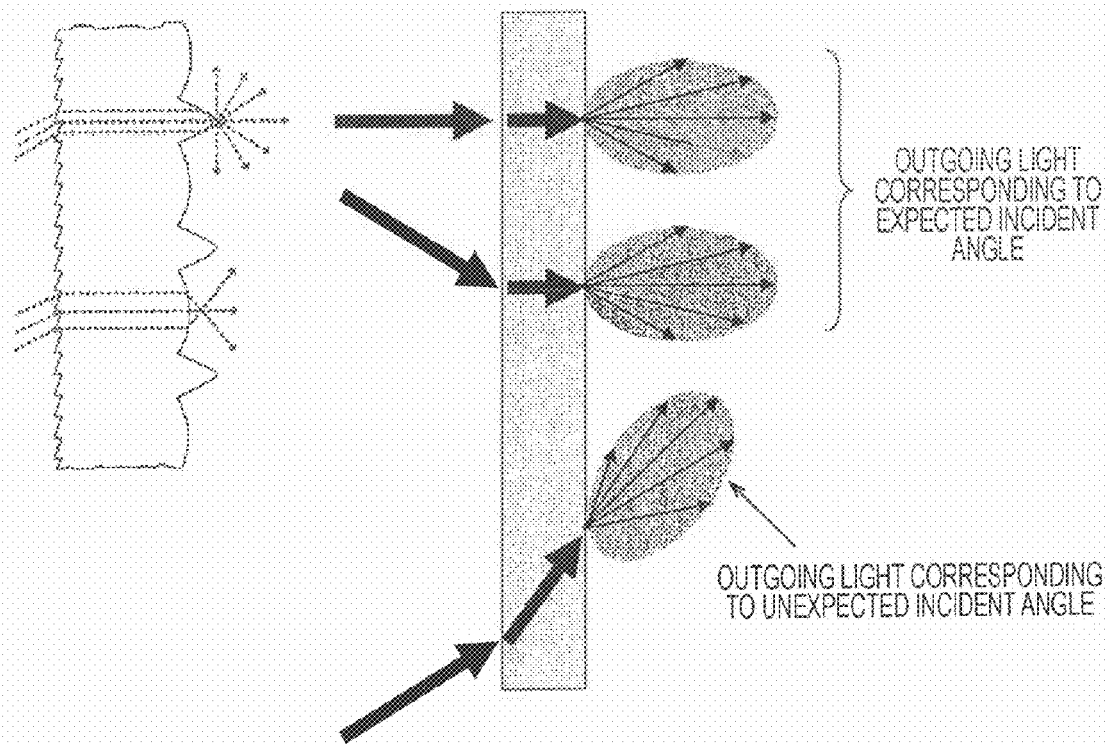
FIG. 20 is an illustration showing a state that an incident light from a projector is diffused at a Fresnel lens.

As one means for solving the problem of the half-power angle of the outgoing light, using a Fresnel lens as a diffusing screen is known in the art. The Fresnel lens may be an effective solution for a projection system composed of a single projector. However, since the Fresnel lens has a limit for a corresponding incident angle, if an illumination light from a projector is incident on the Fresnel lens at an angle other than an expected angle, the diffusion pattern is not reliably provided, and a direction of the outgoing light, that is, a direction in which a high gain is obtained, is not able to be predicted (refer to FIG. 20). That is, it is difficult to eliminate the directional property of the outgoing light transmitted through the Fresnel lens, and it is difficult to achieve a wide viewing angle that is necessary for promoting an increase in size of the picture using the multi-projection.

For example, it can be considered that, the positions of projectors are regulated relative to the position of the Fresnel lens, for example, by arranging the projectors constituting the multi-projection in an array, so that the illumination lights from the projectors are incident on the Fresnel lens at an angle other than an unexpected angle, to reliably provide the diffusion pattern having a high front gain. In this case, an outgoing light having a high front gain is obtained from each of the projectors, and since the outgoing lights are superposed, the change in luminance gain becomes small for the entire screen. However, if the Fresnel lens is used, it is difficult to form a large screen, and hence, the manufacturing cost may become high. Also, a seriously restrictive condition may be applied to the arrangement of the plurality of projectors.

Figure 21:
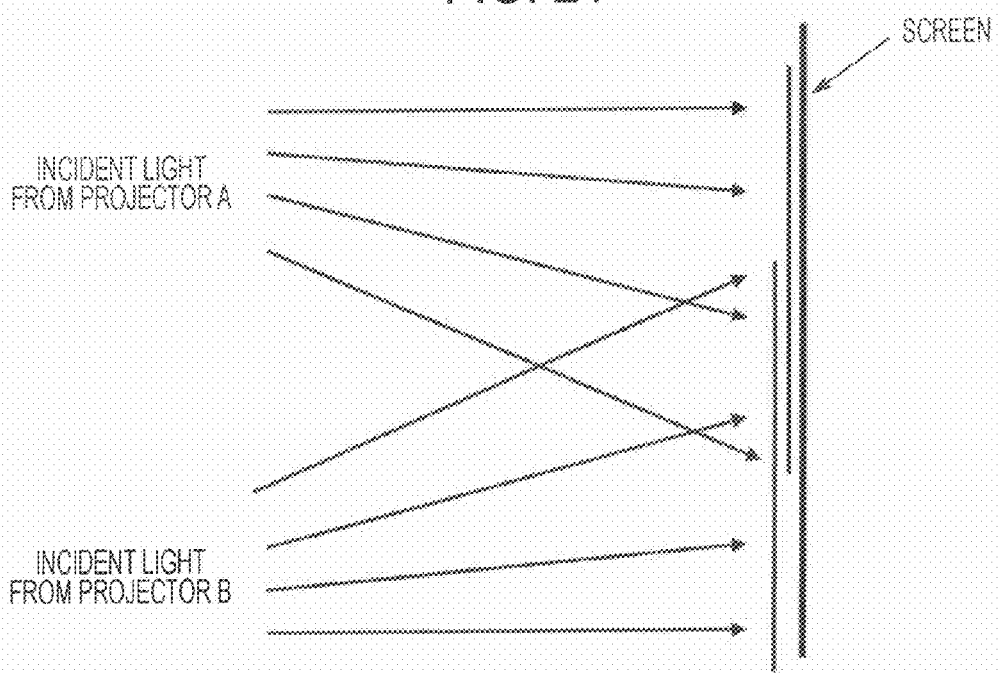
FIG. 21 is an illustration showing a state that change in color and unevenness of luminance appear in accordance with an observation location of a screen because an incident angle of an incident light is different, or because a combination of a plurality of incident angles is different.

Also, in the multi-rear-projector system arranged in an array, even though signal processing is performed so as to obtain a uniform luminance of a projection plane when the screen is viewed from a certain position, as shown in FIG. 21, the incident angle of the incident light, or the combination of the plurality of incident angles is varied depending on the location. This may cause a problem that the change in color, and the unevenness of luminance of each case noticeably appear when the screen is observed from a location deviated from a predetermined position where the entirety is uniformly viewed.

Figure 22:
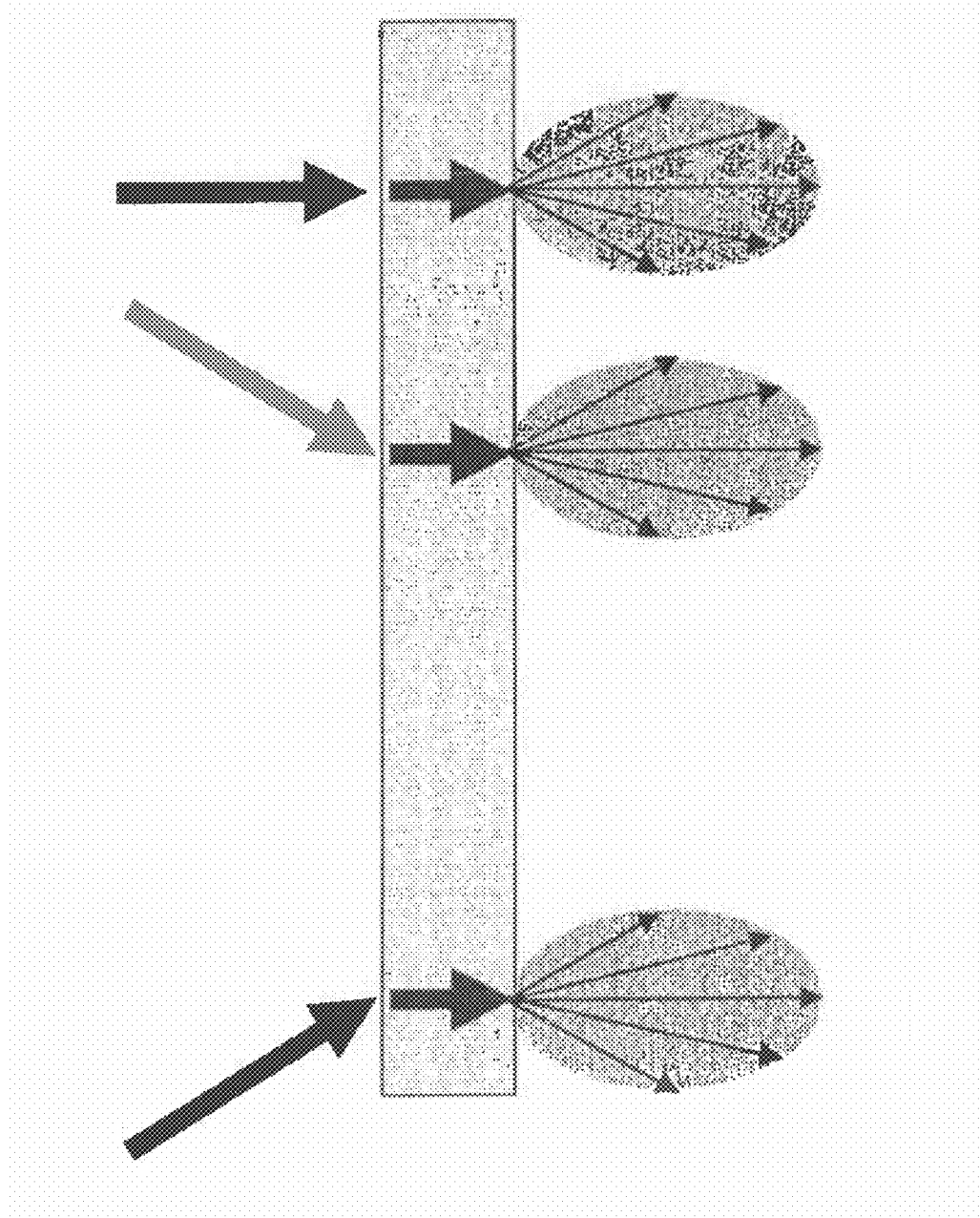
FIG. 22 is an illustration showing a state that incident lights from projectors arranged at any locations are output as outgoing lights uniformly having a high front gain, with the use of the rear projection purpose screen according to the present invention.

Therefore, the present embodiment made an attempt to realize widening the viewing angle of the rear projection type image display apparatus by using the above-described diffusing screen that diffuses the incident light so that any incident light becomes the outgoing light having a high front gain without depending on the incident angle. Such a rear projection purpose screen has no restrictive condition relating to the arrangement of the projectors. As shown in FIG. 22, the incident lights from the projectors at any locations are output as the outgoing lights uniformly having a high front gain. In addition, if the multi-projection is applied, it is expected that a high front gain is obtained after the transmission through the screen without the arrangement of the individual projectors being particularly restricted. Thus, the outgoing lights are superposed on the screen surface on the viewer side, and the change in luminance gain becomes small, that is, the half-power angle becomes large for the entire screen, thereby realizing the widening of the viewing angle.

The rear projection purpose screen providing a wide diffusion characteristic is constituted such that two kinds of screens made of different materials, i.e., a matt screen arranged on the viewer side and a screen arranged on the projector side and made of a fibrous texture, are arranged in parallel. The matt screen mentioned here can be constituted by mixing a diffusing agent into a resin film. For example, diffusing particles are kneaded into vinyl chloride resin and processed by molding. Also, the fibrous texture may employ Tetron pongee or the like. The Tetron pongee is a material of artificial fiber used for a shop pennant and the like. The Tetron pongee is a texture available at an extremely low price (described above).

Figure 10:
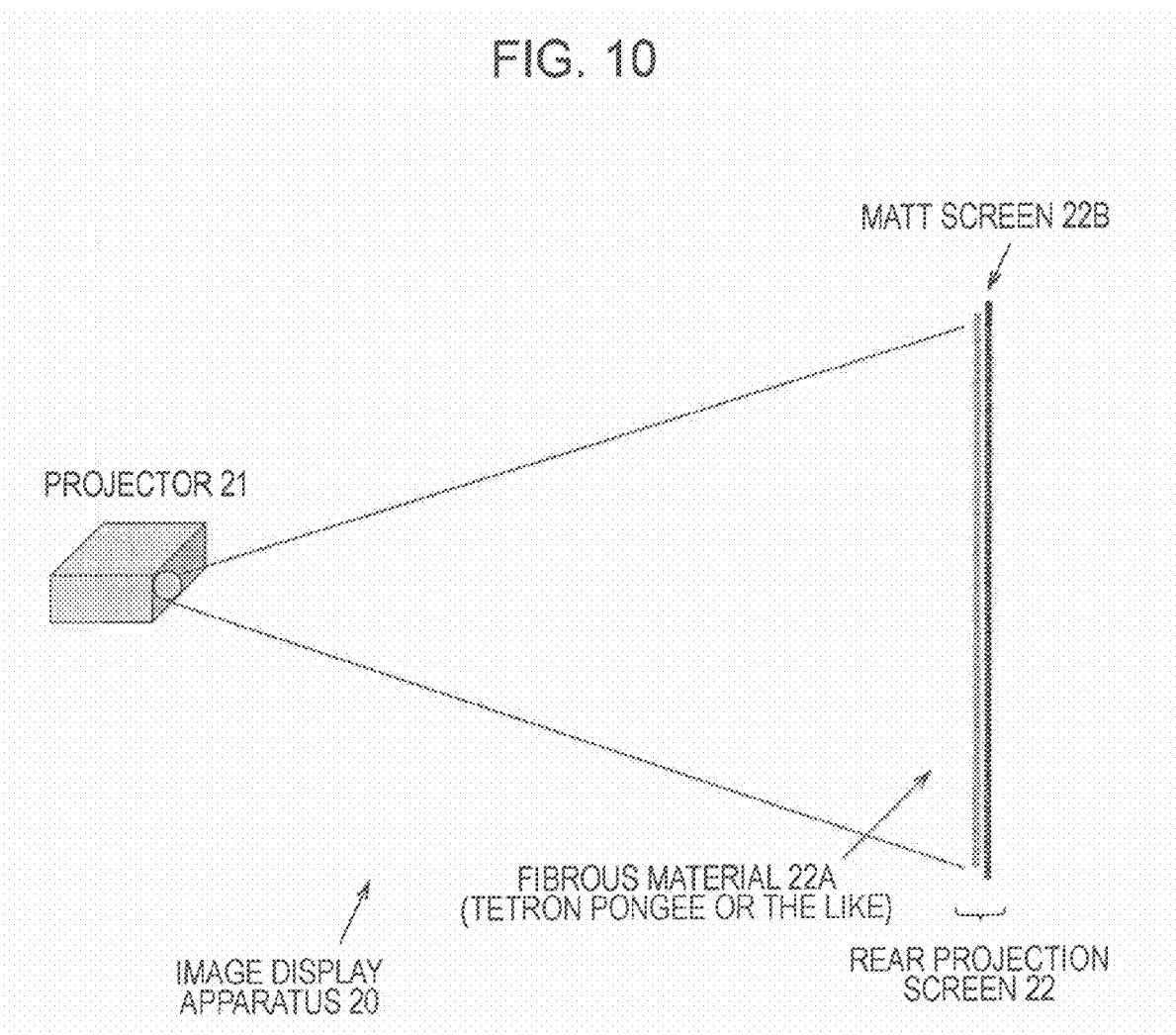
FIG. 10 is an illustration schematically showing a configuration of an image display apparatus according to a second embodiment of the present invention.

FIG. 10 schematically shows a configuration of an image display apparatus according to the second embodiment of the present invention. The illustrated image display apparatus 20 is rear projection type, and constituted by a projector 21 that projects an image having a relatively high luminance, and a rear projection purpose screen 22 installed at an image formation plane of a projection light from the projector 21.

The rear projection purpose screen 22 has a double-layer screen configuration of a matt screen 22B arranged on the viewer side as described above, and a screen 22A arranged on the projector 21 side and made of a fibrous texture, thereby achieving the widening of the viewing angle. If the two screens are sufficiently closely attached, an image can be projected without defocusing. Also, if the two screens are separated by a proper distance, the difference between the colors of the projector 21 can be further reduced, and the image can be defocused.

The matt screen 22B diffuses the incident light. The screen 22A made of the fibrous texture diffracts the incident light in accordance with the fiber roughness. That is, since the incident light is reflected diffusely, the outgoing light can obtain a gain characteristic of a high front gain without depending on the incident angle.

Figure 11:
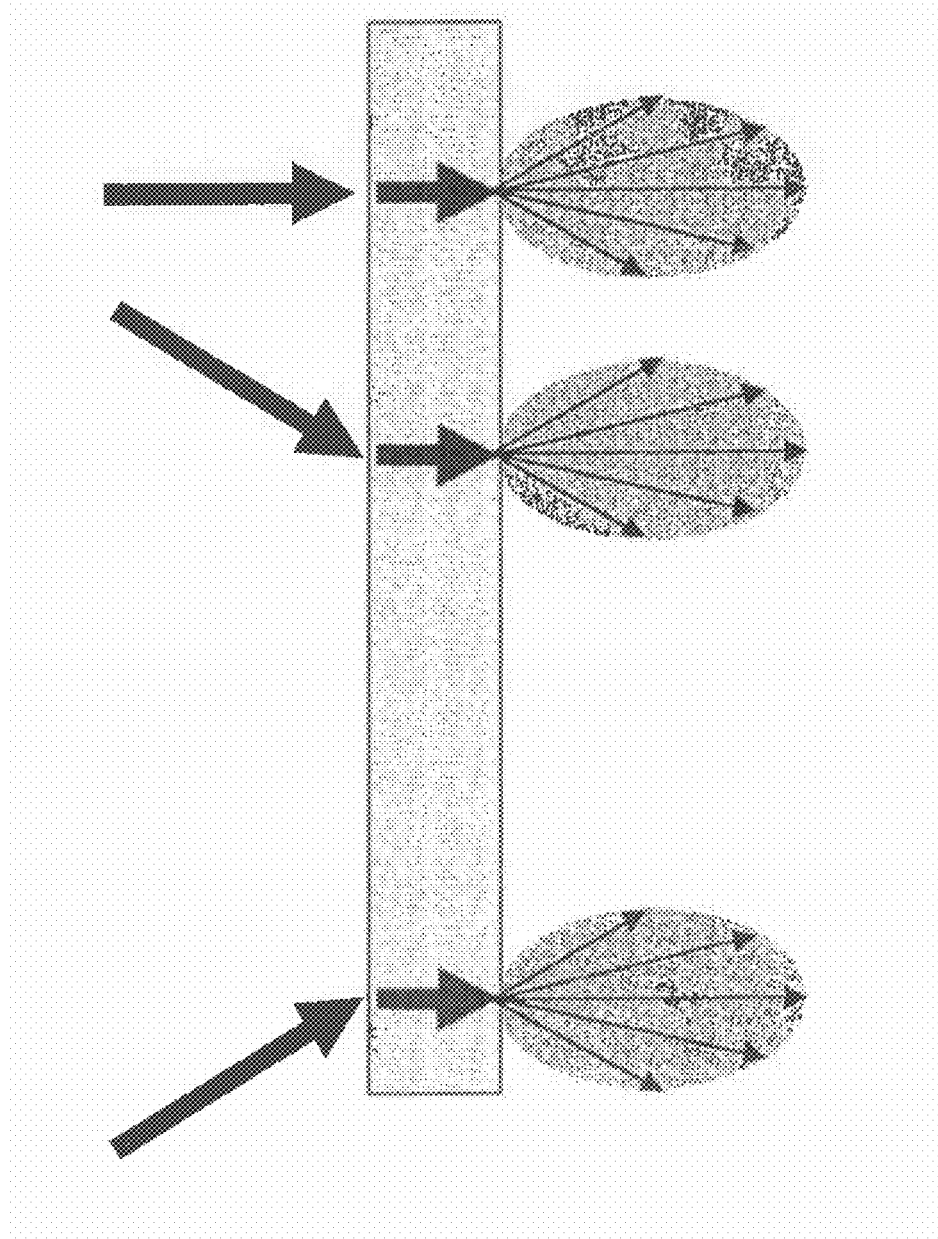
FIG. 11 is an illustration showing a state that a luminance gain of each outgoing light transmitted through a rear projection purpose screen becomes a high front gain.

Such a rear projection purpose screen 22 of the double-layer configuration has the wide viewing angle, and allows the incident lights at any incident angles to be output as the outgoing lights uniformly having a high front gain. Hence, the restrictive condition is not particularly applied to the arrangement of the projector 21. Also, if the multi-projection (not shown) is applied, it is expected that the luminance gain of any outgoing light has a high front gain after being transmitted through the screen without the arrangement of the individual projectors being particularly restricted (refer to FIG. 11).

As described above, in the conventional rear projection, the diffused condition is varied in accordance with the incident angle to the diffusing screen (refer to FIG. 19), whereby it is difficult to expect the application of the multi-projection in view of that the change in color or the unevenness of luminance may be generated depending on a projected location. In contrast, in the present embodiment, the rear projection purpose screen 22 has the wide diffusion characteristic, and hence the change in color and the unevenness of luminance can be prevented by making the diffused condition of the outgoing light for every incident direction be similar as far as possible. Thus, the outgoing lights are superposed on the screen surface on the viewer side, and the change in luminance gain becomes small, that is, the half-power angle becomes large for the entire screen, thereby realizing the widening of the viewing angle. (It is noted that the "wide diffusion" mentioned here means that the directional property of the diffusion pattern of the outgoing light of each projector is reduced for the screen.)

If the rear projection purpose screen 22 of the double-layer configuration is used, the direct light is sometimes not sufficiently blocked, and hence, the above-described direct light blocking portion according to the first embodiment can be additionally used. Although it is expected that the luminance gain of the outgoing light is reduced as compared with the incident light due to the light blocking, the light is not blocked because the diffusion of the diffusion-reflected light generated when being transmitted through the matt screen 22B is not kept (the polarization property of irradiation of the projector is lost due to the diffused-reflection effect at the time of passing though the matt screen 22B).

Figure 12A:
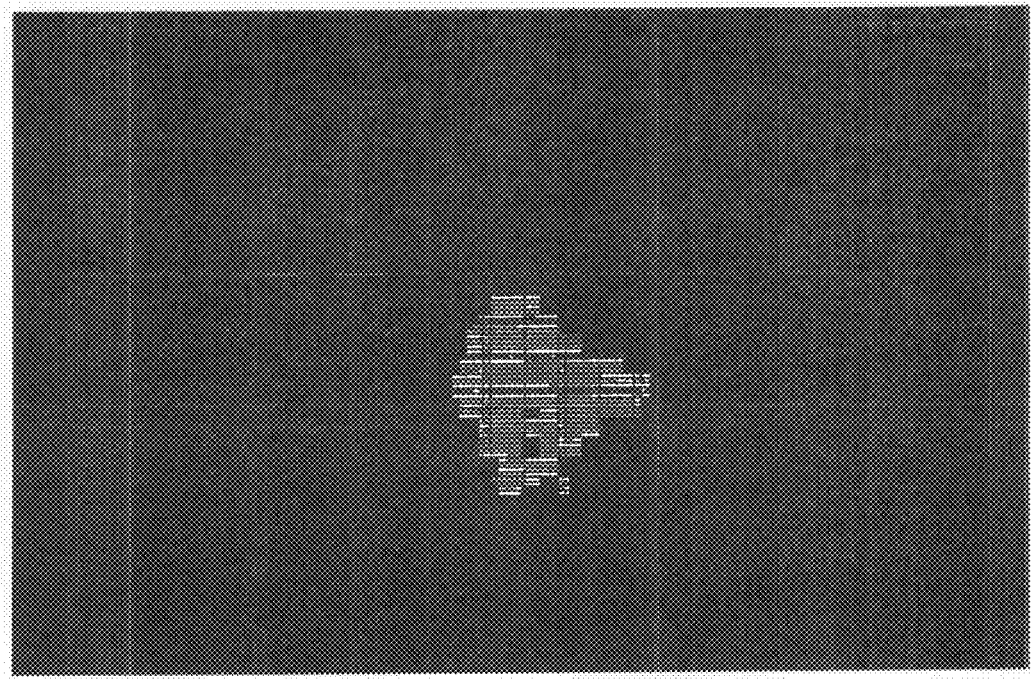
FIG. 12A is a projection image when a view angle is 0 degree with the use of a screen made of only a matt screen.
Figure 12B:
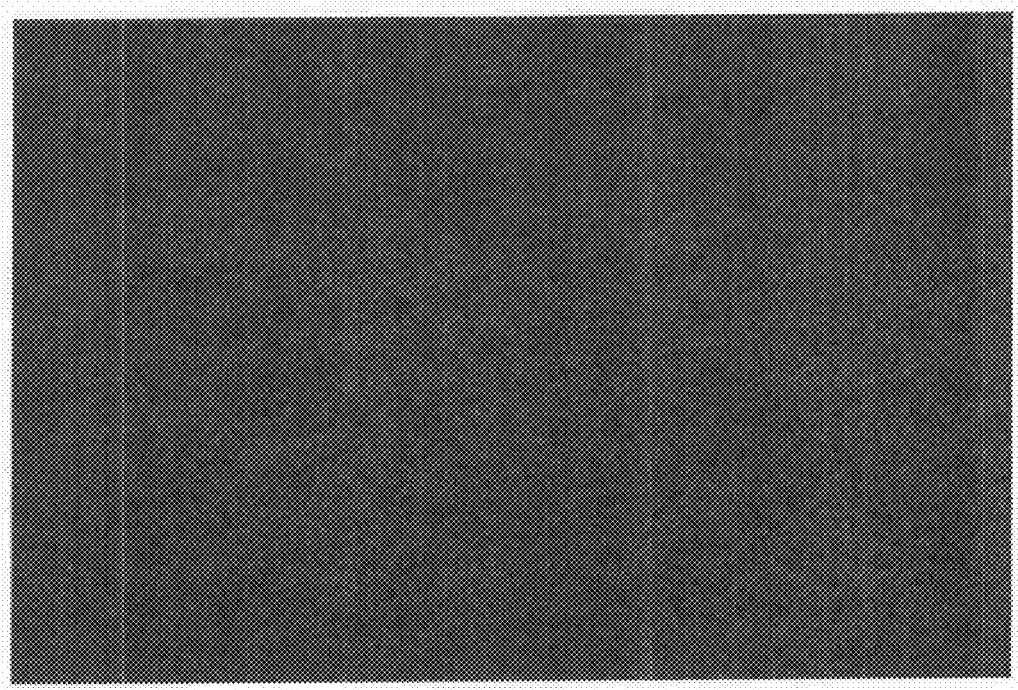
FIG. 12B is the projection image when a view angle is 80 degrees with the use of the screen made of only the matt screen.
Figure 12C:
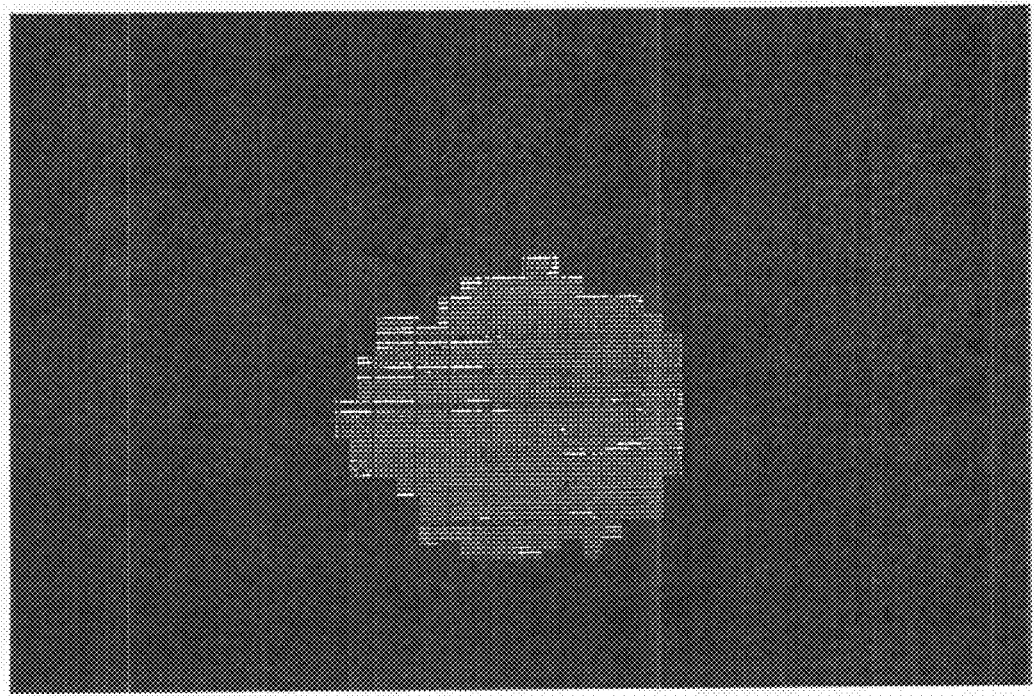
FIG. 12C is a projection image when a view angle is 0 degree with the use of a rear projection purpose screen having a double-layer structure.
Figure 12D:
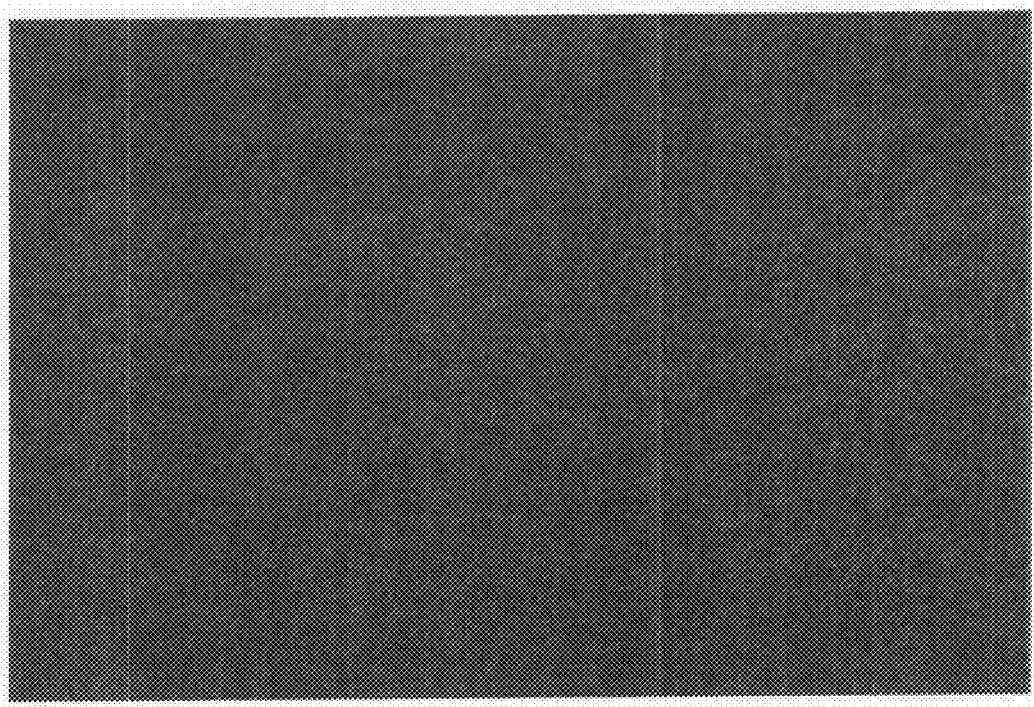
FIG. 12D is the projection image when a view angle is 80 degrees with the use of the rear projection purpose screen having the double-layer structure.

FIGS. 12A to 12D show a comparison between the case where a conventionally used, typical simple diffusing screen is used and the case where the rear projection purpose screen 22 according to the present embodiment is used, for the change in luminance corresponding to the view angle (the view angle is changed with reference to 0 degree in FIG. 18) when the projector 21 directly faces the screen 22 and performs projection (the optical center axis of the projector 21 becomes perpendicular to the surface of the screen 22), as well as for the state of the unevenness of luminance in the projection surface. The illustrated double-layer screen configuration is for the case where two screens are closely attached. FIGS. 12A and 12B are projection images at the view angles of 0 degree and 80 degrees with the use of a screen made of only a matt screen for simply diffusing the transmitted light. Also, FIGS. 12C and 12D are projection images at the view angles of 0 degree and 80 degrees with the use of the rear projection purpose screen 22 of the double-layer structure according to the present embodiment.

Figure 13:
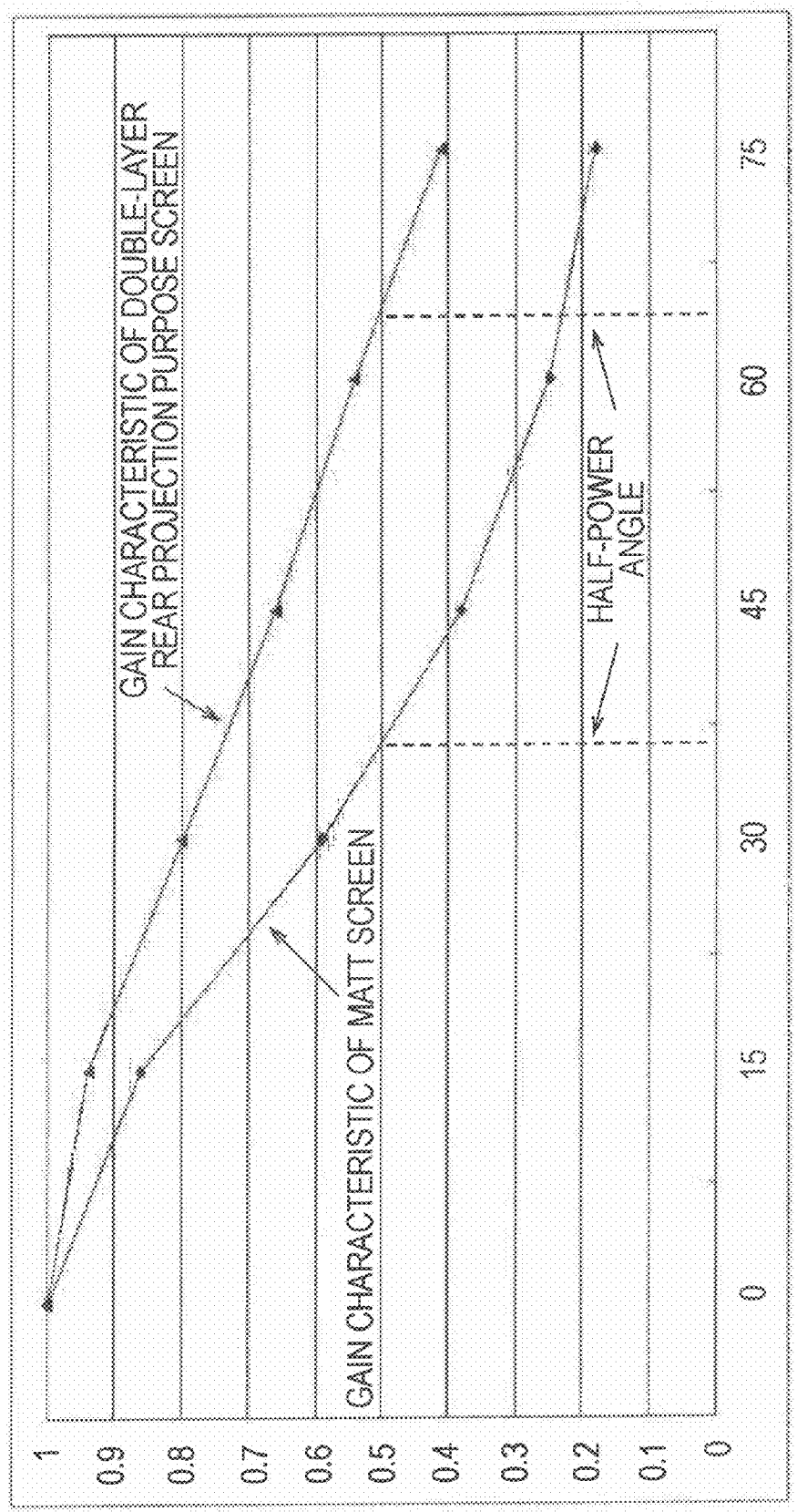
FIG. 13 is an illustration showing characteristics of screen gains obtained through rear projection with the use of a diffusing screen of a conventionally used matt screen, and the rear projection purpose screen according to the present embodiment.

Also, FIG. 13 shows characteristics of screen gains obtained through rear projection with the use of a diffusing screen of a conventionally used matt screen, and through rear projection with the use of the rear projection purpose screen according to the present embodiment. It is noted that, in the same drawing, the luminance of an image displayed on the screen with the projector is measured at each angle with an interval of 15 degrees, using a two-dimensional luminance colorimeter. As shown in the same drawing, if the rear projection purpose screen 22 according to the present embodiment is used, as compared with the case where the conventional simple diffusion type screen is used, the change in luminance level has a smaller gradient as compared with the change in incident angle of the incident light to the screen from the projector (attenuation becomes small), the half-power angle becomes large, and the high luminance level can be obtained for the entire incident angles.

Figure 14:
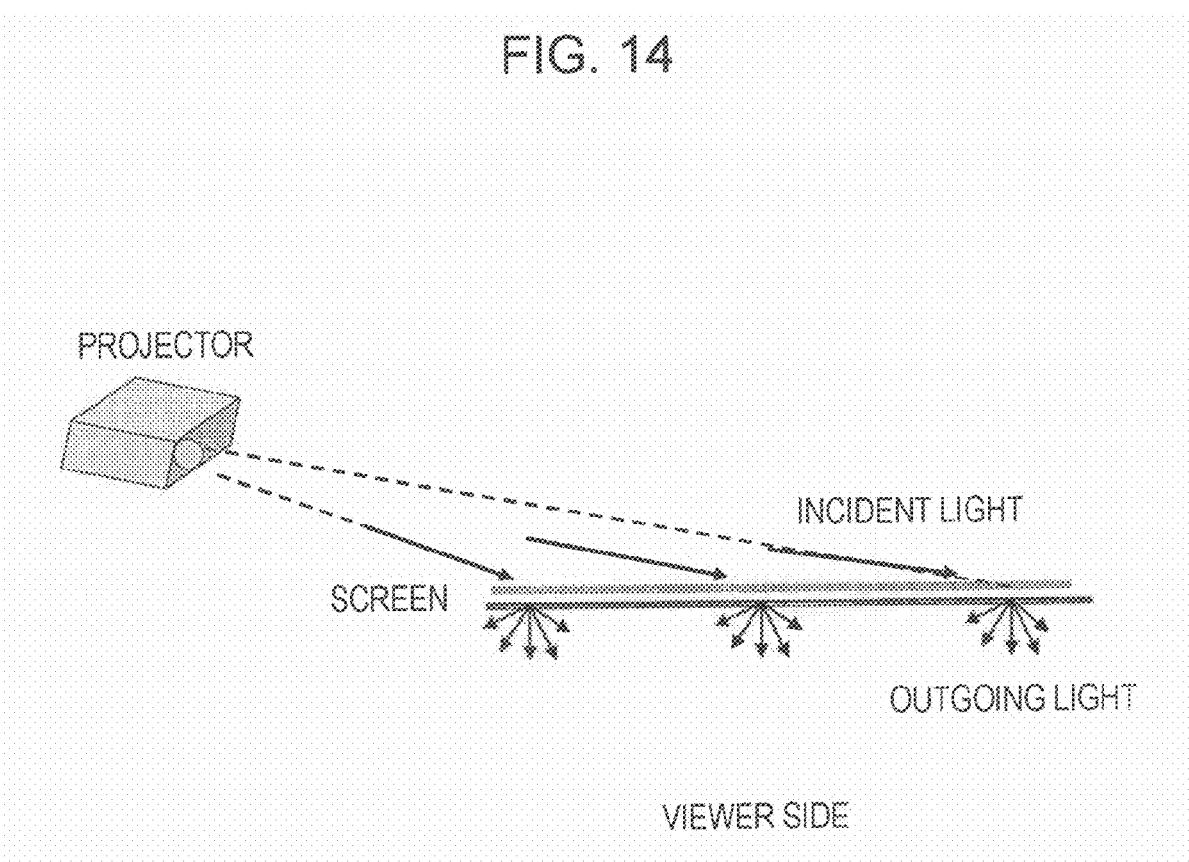
FIG. 14 is an illustration showing a state of an outgoing light when a projector is installed so as to have various incident angles.

As described above, since the rear projection purpose screen 22 of the double-layer structure has the wide viewing angle, there is no restrictive condition relating to the arrangement of the projectors, and the incident lights from the projectors at any locations can be output as the outgoing lights uniformly having a high front gain. As shown in FIG. 14, even when the projectors are installed so as to have various incident angles, the corresponding outgoing lights have a high front gain, thereby expecting the advantage of the widening of the viewing angle. In other words, even when the optical center axis of the incident light from the projector does not correspond to the axis perpendicular to the screen surface while the projector performs projection on the screen, the change in color and the change of luminance depending on the viewing position can be reduced.

Figure 16:
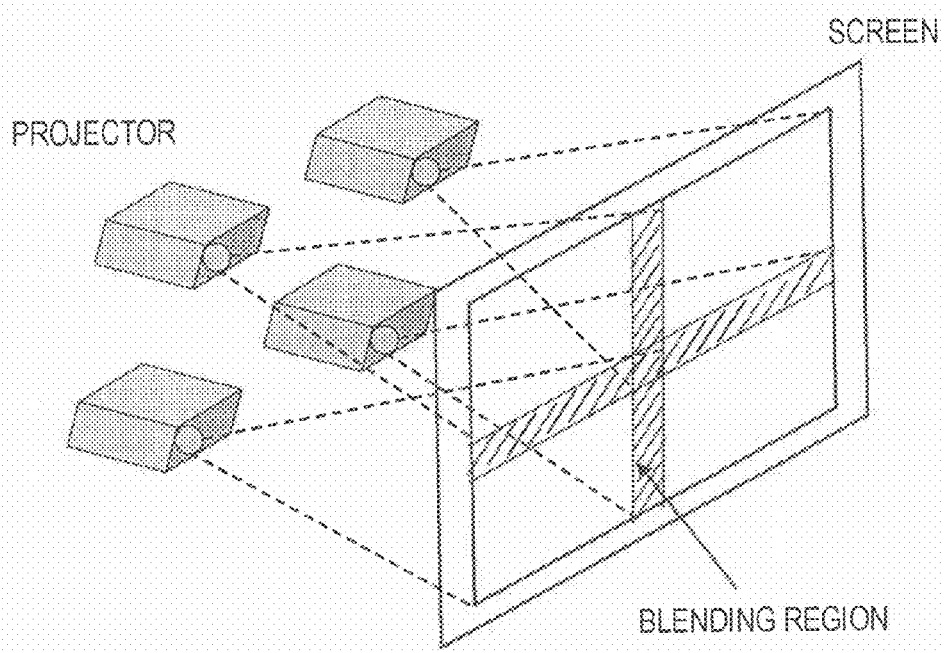
FIG. 16 is an illustration showing an example configuration of a multi-projection system.

Thus, if the multi-projection (refer to FIG. 16) is applied to the image display apparatus shown in FIG. 10, the installation location of each projector is not restricted to the fixed one position, and may attain the advantage at any location, regardless of the number of the projectors.

In the multi-projection system of a type that outgoing lights from a plurality of projectors arranged in an array are superposed and projected on a screen, the difference in color and the difference in luminance due to the individual difference among the individual projectors frequently become problems, in a "blending region" (refer to FIG. 16) where the projection planes of the projectors are superposed. FIG. 15 shows a state that outgoing lights from a plurality of projectors arranged in an array are superposed and projected on a conventional screen of simple diffusion type, and a state that the outgoing lights are superposed and projected on the rear projection purpose screen 22 of the double-layer structure according to the present embodiment.

Figure 15A:
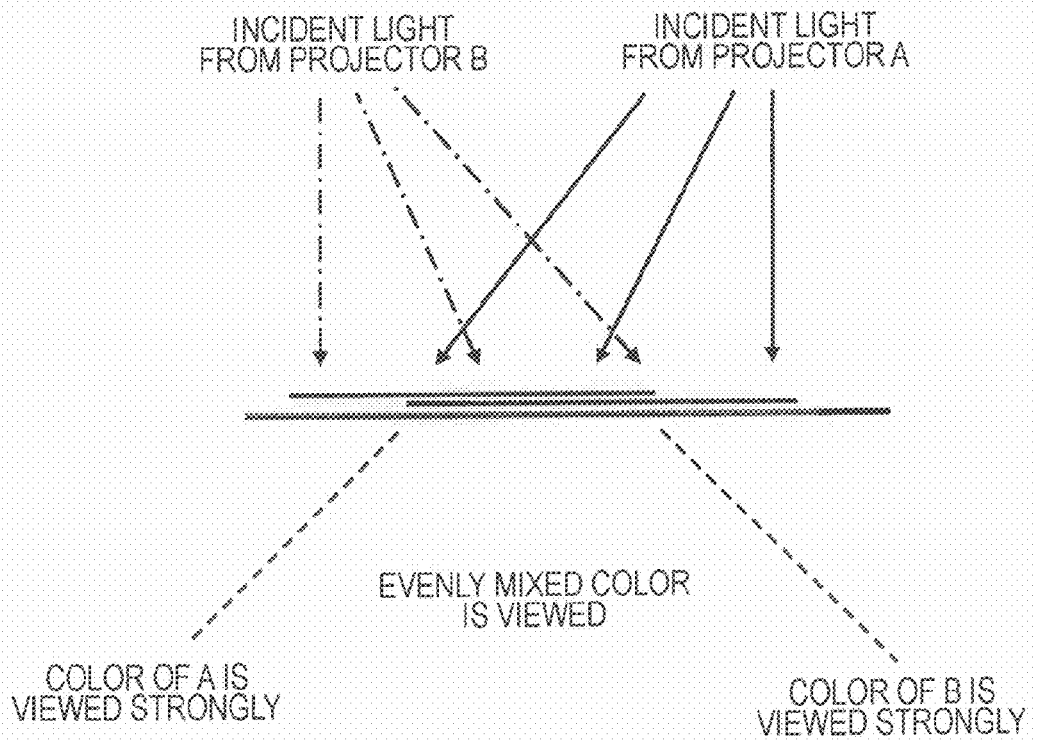
FIG. 15A is an illustration showing a state that outgoing lights from a plurality of projectors arranged in an array are superposed and projected on a simple diffusion type screen.

As shown in FIG. 15A, in the conventional, simply diffusing screen, the incident light from each projector is transmitted through the screen, and then has a diffusion pattern with a high gain in the outgoing-light direction. Hence, the blending region contains a part viewed such that the colors of the incident lights from the projectors are evenly mixed, and a part viewed such that the colors of the incident lights from certain projectors are strong, whereby the problems of the difference in color, and the difference in luminance become noticeable.

Figure 15B:
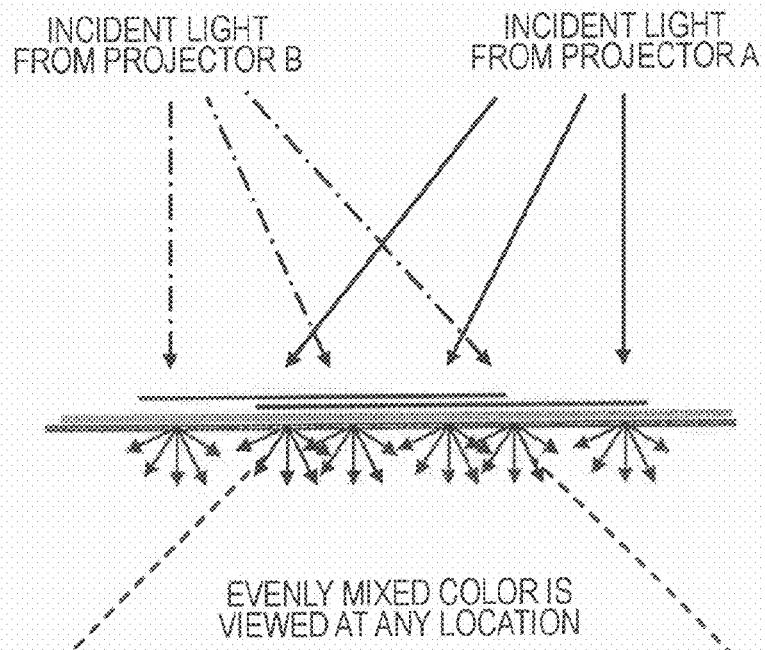
FIG. 15B is an illustration showing a state that outgoing lights from the plurality of projectors arranged in an array are superposed and projected on a rear projection purpose screen 22 having a double-layer structure.

In contrast, when the superposition and projection are performed on the rear projection screen of the double-layer structure according to the present embodiment, all incident lights are evenly diffused in all directions, whereby the projection image, in which the decrease in luminance is small, and the change in color is small, can be obtained regardless of the observation position, even in the blending region. That is, as shown in FIG. 15B, the luminance in the blending region does not depend on the observation position, and degradation in a tile form can be reduced.

INDUSTRIAL APPLICABILITY

Hereinbefore, the present invention has been described in detail with reference to the specific embodiments. However, it is obvious that a person skilled in the art may make modification or substitution for the embodiments within the scope of the present invention.

The texture used for the transmission type screen is desired to be a material such as cotton, silk, or artificial fiber such as Tetron pongee, which transmits a direct light.

When the rear projection type image display apparatus according to the present invention is used for constructing as large screen as 300 inches or more, the texture used as the screen may use rolled textures having a width of 2 meters attached together. Also, the polarizing plate may use one having a size of about 1 meter☐0.5 meter, and these may be attached together.

That is, the present invention has been disclosed with example embodiments, and the content written in the present description should not be subjected to limited interpretation. In order to determine the gist of the present invention, the claims should be taken into consideration.

The invention claimed is:

1. A rear projection image display apparatus comprising:
   a projector configured to project an image having a high luminance;
   a transmission type screen including a first screen having a fibrous texture and configured to diffract light incident from the projector in accordance with a fiber roughness of the fibrous texture, and a second screen comprising diffusing particles in a vinyl chloride resin attached to the first screen on a side of the first screen opposite the projector and configured to diffuse light incident from the first screen and output the diffused light;

a first polarizing plate having a first polarization direction, the first polarizing plate disposed in front of an exit pupil of the projector and at a first distance from the transmission type screen; and a second polarizing plate having a second polarizing direction that is substantially orthogonal to the first polarization direction, the second polarizing plate being disposed near a rear surface side opposite to an irradiation surface of the transmission type screen and at a second distance from the transmission type screen, which is smaller than the first distance, wherein only the first polarizing plate and the second polarizing plate are configured to polarize the image projected from the projector.

2. The rear projection image display apparatus according to claim 1, wherein the first screen is made of cotton.

3. The rear projection image display apparatus according to claim 1, wherein the first screen is made of silk.

4. The rear projection image display apparatus according to claim 1, wherein the first screen is made of pongee.

5. The rear projection image display apparatus of claim 1, wherein a gain characteristic of the diffused light output from the second screen is greater than 0.9 for light incident on the first screen at an angle of 15 degrees.

6. The rear projection image display apparatus of claim 1, wherein a gain characteristic of the diffused light output from the second screen is approximately 0.8 for light incident on the first screen at an angle of 30 degrees.

7. The rear projection image display apparatus of claim 1, wherein a gain characteristic of the diffused light output from the second screen is greater than 0.6 for light incident on the first screen at an angle of 45 degrees.

8. The rear projection image display apparatus of claim 1, wherein a gain characteristic of the diffused light output from the second screen is greater than 0.5 for light incident on the first screen at an angle of 60 degrees.

9. The rear projection image display apparatus of claim 1, wherein a gain characteristic of the diffused light output from the second screen is greater than 0.4 for light incident on the first screen at an angle of 75 degrees.

10. The rear projection image display apparatus according to claim 1, wherein in the projection light from the projector, color components are respectively polarized in predetermined directions, and the first and second polarization directions are configured to be nonparallel to a polarization direction of any of the color components of the projection light.

11. The rear projection image display apparatus according to claim 10, wherein the projector is a 3LCD projector that separates an illumination light from a high luminance, single light source into color components of three primary colors of RGB, combines the light controlled by LCDs respectively corresponding to the colors, and then projects the light, a polarization direction of the light of R and B projected from the exit pupil and a polarization direction of the light of G defining 90 degrees, and the polarization direction of the second polarizing plate is arranged so as to define about 45 degrees with respect to the polarization directions of the light of R, B and G.

12. The rear projection image display apparatus according to claim 1, wherein a surface area of the first polarizing plate is less than a surface area of the second polarizing plate.

13. The rear projection image display apparatus according to claim 1, wherein the first polarizing plate is disposed closer to the front exit of the pupil of the projector than the transmission type screen.

14. The rear projection image display apparatus according to claim 1, wherein the first polarizing plate is a heat-resistant polarizing plate.

* * * * *